US011240512B2

(12) United States Patent
Ikonin

(10) Patent No.: US 11,240,512 B2
(45) Date of Patent: Feb. 1, 2022

(54) INTRA-PREDICTION FOR VIDEO CODING USING PERSPECTIVE INFORMATION

(71) Applicant: Huawei Technologies Co., Ltd., Shenzhen (CN)

(72) Inventor: Sergey Yurievich Ikonin, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 102 days.

(21) Appl. No.: 16/702,083

(22) Filed: Dec. 3, 2019

(65) Prior Publication Data

US 2020/0107026 A1    Apr. 2, 2020

Related U.S. Application Data

(63) Continuation of application No. PCT/RU2017/000413, filed on Jun. 14, 2017.

(51) Int. Cl.
*H04N 19/159*   (2014.01)
*H04N 19/11*    (2014.01)
*H04N 19/136*   (2014.01)
*H04N 19/176*   (2014.01)
*H04N 1/333*    (2006.01)
(Continued)

(52) U.S. Cl.
CPC ....... *H04N 19/159* (2014.11); *H04N 1/33307* (2013.01); *H04N 1/41* (2013.01); *H04N 19/11* (2014.11); *H04N 19/136* (2014.11); *H04N 19/176* (2014.11); *H04N 19/61* (2014.11); *H04N 2201/33357* (2013.01)

(58) Field of Classification Search
CPC .... H04N 19/159; H04N 19/11; H04N 19/136; H04N 19/176

USPC ........................................................ 375/240
See application file for complete search history.

(56) References Cited

U.S. PATENT DOCUMENTS

2005/0135658 A1    6/2005 Yamamoto et al.
2009/0028248 A1    1/2009 Kitahara et al.
(Continued)

FOREIGN PATENT DOCUMENTS

CN    103299610 A    9/2013
CN    104506872 A    4/2015
(Continued)

OTHER PUBLICATIONS

Caprile et al., "Using Vanishing Points for Camera Calibration," International Journal of Computer Vision, vol. 4, XP000847613, pp. 127-140 (1990).
(Continued)

*Primary Examiner* — Christopher S Kelley
*Assistant Examiner* — Asmamaw G Tarko
(74) *Attorney, Agent, or Firm* — Leydig, Voit & Mayer, Ltd.

(57) ABSTRACT

A method of decoding video, comprising: receiving an encoded bit stream representing frames of video, each of the frames comprising blocks of pixels; for a current block to be decoded, obtaining a vanishing point from the encoded bit stream and calculating pixel values of the current block to be decoded by performing intra-prediction based on a prediction line originating in the vanishing point; and providing decoded video based on the calculated pixel values. A method of encoding video, an encoder, and a decoder are also disclosed.

19 Claims, 28 Drawing Sheets

(51) Int. Cl.
*H04N 19/61* (2014.01)
*H04N 1/41* (2006.01)

(56) References Cited

U.S. PATENT DOCUMENTS

| | | | |
|---|---|---|---|
| 2012/0008683 A1* | 1/2012 | Karczewicz | H04N 19/593 |
| | | | 375/240.12 |
| 2014/0111611 A1* | 4/2014 | Lecroart | H04N 19/156 |
| | | | 348/43 |
| 2016/0073107 A1 | 3/2016 | Moon et al. | |
| 2016/0112704 A1 | 4/2016 | Grange et al. | |
| 2016/0142697 A1 | 5/2016 | Budagavi et al. | |
| 2017/0127081 A1* | 5/2017 | Yoshikawa | H04N 19/105 |

FOREIGN PATENT DOCUMENTS

| | | | |
|---|---|---|---|
| CN | 106464900 A | 2/2017 | |
| EP | 2536142 A1 | 12/2012 | |
| EP | 3171597 A1 | 5/2017 | |
| WO | 2012026122 A1 | 3/2012 | |
| WO | WO-2012026122 A1 * | 3/2012 | H04N 19/61 |

OTHER PUBLICATIONS

Oh et al., "RANSAC-based Orthogonal Vanishing Point Estimation in the Equirectangular Images," Journal of Korea Multimedia Society vol. 15, No. 12, pp. 1430-1441 (Dec. 2012).
Seo et al., "Detection and Tracking of the Vanishing Point on a Horizon for Automotive Applications," pp. 1-6 (Sep. 2014).
Antunes et al., "A Global Approach for the Detection of Vanishing Points and Mutually Orthogonal Vanishing Directions," 2013 IEEE Conference on Computer Vision and Pattern Recognition, pp. 1336-1343, Institute of Electrical and Electronics Engineers, New York, New York (2013).
Sullivan, "Video Coding: Recent Developments for HEVC and Future Trends," Presentation for Data Compression Conference, Snowbird, Utah, Video Architect, Microsoft Corporate Standards Group (Mar. 30, 2016).
"Algorithm Description of Joint Exploration Test Model 1 (JEM 1)," International Organization for Standardization Organisation Internationale De Normalisation ISO/IEC JTC1/SC29/WG11 Coding of Moving Pictures and Audio, ISO/IEC JTC1/SC29/WG11/N15790, Geneva, CH, pp. 1-25 (Oct. 2015).
Sullivan et al., "Overview of the High Efficiency Video Coding (HEVC) standard," IEEE Transactions on Circuits and Systems for Video Technology, vol. 22, No. 12, pp. 1649-1668, Institute of Electrical and Electronics Engineers, New York, New York (Dec. 2012).
Choi et al., "Test sequence formats for virtual reality video coding," Joint Video Exploration Team (JVET) of ITU-T SG 16 WP 3 and ISO/IEC JTC 1/SC 29/WG 11, 3rd Meeting: Geneva, CH, JVET-C0050, International Telecommunication Union, Geneva, Switzerland (May 26-Jun. 1, 2016).
"Series H: Audiovisual and Multimedia Systems, Infrastructure of audiovisual services—Coding of moving video, High efficiency video coding," Recommendation of ITU-T H.265, pp. 1-664, International Telecommunication Union, ITU-T Telecommunication Standardization Sector of ITU, Geneva, Switzerland (Dec. 2016).
"Series H: Audiovisual and Multimedia Systems, Infrastructure of audiovisual services—Coding of moving video, Advanced video coding for generic audiovisual services," Recommendation ITU-T H.264, pp. 1-812, International Telecommunication Union, ITU-T Telecommunication Standardization Sector of ITU, Geneva, Switzerland (Apr. 2017).

* cited by examiner

INTRA-PREDICTION FOR VIDEO CODING USING PERSPECTIVE INFORMATION

CROSS-REFERENCE TO RELATED APPLICATIONS

This application is a continuation of International Application No. PCT/RU2017/000413, filed on Jun. 14, 2017, the disclosure of which is hereby incorporated by reference in its entirety.

TECHNICAL FIELD

Embodiments of the present application relate to the field of video coding, and more particularly to a video encoder, video decoder, and related methods and computer programs.

BACKGROUND

To reduce the bit-rate of video signals, the International Organization for Standardization (ISO) and International Telecommunication Union (ITU) coding standards apply hybrid video coding with inter-frame prediction and intra-frame prediction combined with transform coding of a prediction error. The prediction error is called the residual. For example, intra-frame prediction may be used. Intra-frame prediction means encoding or decoding a current block in a frame based on reference pixels from already encoded blocks of the same frame. In intra-frame encoding or decoding, the residual, i.e., the difference between the pixel values of the current block and predicted pixel values of that block, is encoded or decoded, respectively. The residual may be encoded, for example, by transforming it to a frequency domain (e.g., using discrete cosine transform (DCT) or discrete sine transform (DST)), quantizing, and coding with, e.g., entropy coding.

Currently, the intra-frame prediction mechanism in video coding uses the values of reference pixels (also referred to herein as reference samples) from an already encoded area to generate a prediction signal for a block that needs to be encoded, as illustrated by diagram 1000 in FIG. 10 and by flow chart steps 1101-1104 in FIG. 11. The prediction signal is generated using a prediction mode which is signaled in the bit stream. Current video coding standards may use e.g. 33 directional modes (used to represent blocks containing edges and lines) as well as a DC mode and a planar mode. Accordingly, directional intra-frame prediction may be performed along a straight line of one of the 33 possible directions.

Effectiveness of the prediction influences the amount of residuals that need to be coded and transmitted. Accordingly, improving quality of prediction can reduce the amount of residual information and reduce the overall bitrate of a coded video sequence.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In this application, the term "pixel value" means an intensity value of a pixel, i.e. an indication of an intensity level of the pixel. The intensity may be the intensity of a color component of the pixel. Alternatively, the intensity may comprise the intensities of several color components of the pixel.

It is an object of the disclosure to provide improved video coding. The foregoing and other objects are achieved by the features of the independent claims. Further implementation forms are apparent from the dependent claims, the description and the figures.

According to a first aspect a video encoder is provided, the video encoder comprising: an input unit configured to receive frames of video, each of the frames comprising blocks of pixels; an intra-prediction unit configured to, for a current block to be encoded, determine a vanishing point and generate a residual, by performing intra-prediction based on a prediction line which originates in the vanishing point; and an output unit configured to provide an encoded bit stream based on the residual. Thus a particular intra-prediction scheme is proposed. Given a reference pixel set comprising one or more reference pixels (e.g., at the edge of the current block) and a line (prediction line) that runs through one or more of the reference pixels, a subset of pixels inside the current block may be defined as a set of pixels situated on the prediction line, or situated approximately on the prediction line (e.g., with a precision of one pixel). The pixel values of the subset are predicted (i.e. predicted values of these pixels are determined) based on the values of the reference pixels, e.g., by extrapolation or by interpolation along the prediction line. Using vanishing points in the intra-prediction allows savings in signaling and better prediction accuracy, thereby allowing more efficient intra-prediction for video. More efficient intra-prediction allows reducing the amount of residual information that needs to be encoded and transmitted, thus reducing the overall bit rate of an associated bit stream.

In a first possible implementation of the video encoder according to the first aspect, the video comprises non-spherical video and the prediction line comprises a straight line.

In a second possible implementation of the video encoder according to the first aspect, the video comprises spherical video and the prediction line comprises a geodesic curve. Intra-prediction along a geodesic curve can be particularly efficient because the geodesic curve in the spherical video can correspond to a straight line in the original three-dimensional scene that is represented in the spherical video.

In a third possible implementation of the video encoder according to the first aspect as such or according to any of the preceding implementations of the first aspect, the intra-prediction unit is further configured to perform the intra-prediction along the prediction line for every pixel of the current block to be encoded. Using the same prediction line for all pixels of the current block allows simplified computations.

In a fourth possible implementation of the video encoder according to the first aspect as such or according to any of the preceding implementations of the first aspect, the intra-prediction unit is further configured to perform the intra-prediction by using a directional mode closest to the prediction line. Using a directional mode closest to the prediction line allows simplified computations.

In a fifth possible implementation of the video encoder according to the first aspect as such or according to any of the preceding implementations of the first aspect, the intra-prediction unit is further configured, for the current block to be encoded, to perform the intra-prediction along pixel-specific predetermined prediction lines originating in the vanishing point. Using pixel-specific prediction lines allows enhanced prediction accuracy.

In a sixth possible implementation of the video encoder according to the first aspect as such or according to any of the preceding implementations of the first aspect, the intra-prediction unit is further configured to assign an identical identifier for each prediction line converging in a same predetermined vanishing point. Using an identical identifier for each prediction line originating in a same vanishing point allows savings in signaling and better prediction accuracy, thereby allowing more efficient intra-prediction for video.

In a seventh possible implementation of the video encoder according to the first aspect as such or according to any of the preceding implementations of the first aspect, the intra-prediction unit is further configured to use a first indicator to indicate whether to perform the intra-prediction based on the prediction line originating in the vanishing point.

In an eighth possible implementation of the video encoder according to the first aspect as such or according to any of the preceding implementations of the first aspect, the intra-prediction unit is further configured to perform the intra-prediction based on one of at least two vanishing points for at least one of the received frames of video. Using two or more vanishing points in one frame of video allows further savings in signaling and better prediction accuracy, thereby allowing more efficient intra-prediction for video.

In a ninth possible implementation of the video encoder according to the eighth implementation of the first aspect, the intra-prediction unit is further configured to use a second indicator to indicate which particular vanishing point is used to define the prediction line(s) for a given block.

According to a second aspect a video decoder is provided, the video decoder comprising: an input unit configured to receive an encoded bit stream representing frames of video, each of the frames comprising blocks of pixels; an intra-prediction unit configured, for a current block to be decoded, to obtain a vanishing point from the bitstream and calculate pixel values of the current block to be decoded, by performing intra-prediction based on a prediction line originating in the vanishing point; and an output unit configured to provide decoded video based on the calculated pixel values. Using vanishing points in the intra-prediction allows savings in signaling and better prediction accuracy, thereby allowing more efficient intra-prediction for video. More efficient intra-prediction allows reducing the amount of residual information that needs to be received and decoded, thus reducing the overall bit rate of an associated bit stream. Vanishing points can be obtained from the bitstream in different ways by the decoder, depending on the implementation details and/or depending on the information in the bitstream. For example, a vanishing point may be signaled explicitly in the bitstream. Or it may be derived implicitly from other information in the bitstream. For example, a vanishing point may be calculated from a previously reconstructed picture. Or it may be passed as meta-information. In one implementation form, the vanishing point for the current block to be decoded is obtained from vanishing point information encoded in the bitstream. For example, the bitstream may comprise vanishing point information which indicates for a frame (or collectively for a group of one or more successive frames) a set of one or more vanishing points. The vanishing point information may further indicate, for one or more blocks of that frame, one vanishing point from the set of vanishing points of the respective frame, thus indicating one vanishing point for the respective block to decoded. The vanishing point information may signaled in the form of dedicated bits in the bitstream (i.e., explicitly), or in any other suitable way that allows determining a vanishing point for a given block unambiguously from the bitstream.

In a first possible implementation of the video decoder according to the second aspect, the video comprises non-spherical video and the prediction line comprises a straight line.

In a second possible implementation of the video decoder according to the second aspect, the video comprises spherical video and the prediction line comprises a geodesic curve. Intra-prediction along a geodesic curve can be particularly efficient because the geodesic curve in the spherical video can correspond to a straight line in the original three-dimensional scene that is represented in the spherical video. Using vanishing points in the intra-prediction allows savings in signaling and better prediction accuracy, thereby allowing more efficient intra-prediction for spherical video. More efficient intra-prediction allows reducing the amount of residual information that needs to be received and decoded, thus reducing the overall bit rate of an associated bit stream.

In a third possible implementation of the video decoder according to the second aspect as such or according to any of the preceding implementations of the second aspect, the intra-prediction unit is further configured to perform intra-prediction along the prediction line for every pixel of the current block to be decoded. Using the same prediction line for all pixels of the block allows simplified computations.

In a fourth possible implementation of the video decoder according to the second aspect as such or according to any of the preceding implementations of the second aspect, the intra-prediction unit is further configured to perform the intra-prediction by using a directional mode closest to the prediction line. Using a directional mode closest to a single prediction line converging in the vanishing point allows simplified computations.

In a fifth possible implementation of the video decoder according to the second aspect as such or according to any of the preceding implementations of the second aspect, the intra-prediction unit is further configured to perform the intra-prediction along pixel-specific prediction lines originating in the vanishing point for the current block to be decoded. Using pixel-specific prediction lines allows enhanced prediction accuracy.

In a sixth possible implementation of the video decoder according to the second aspect as such or according to any of the preceding implementations of the second aspect, the intra-prediction unit is further configured to use a first indicator to determine whether to perform the intra-prediction based on the prediction line originating in the vanishing point.

In a seventh possible implementation of the video decoder according to the second aspect as such or according to any of the preceding implementations of the second aspect, the intra-prediction unit is further configured to perform the intra-prediction based on one of at least two vanishing points for at least one of the frames of video represented by the received encoded bit stream.

In an eighth possible implementation of the video decoder according to the eighth implementation of the second aspect, the intra-prediction unit is further configured to use a second indicator to determine which particular vanishing point is used to define the prediction line(s) for a given block.

According to a third aspect a method of encoding video is provided, the method comprising: receiving frames of video, each of the frames comprising blocks of pixels; for a current block to be encoded, determining a vanishing point and generating a residual by performing intra-prediction based on a prediction line originating in the vanishing point; and providing an encoded bit stream based on the residual. Using vanishing points in the intra-prediction allows savings in signaling and better prediction accuracy, thereby allowing more efficient intra-prediction for video. More efficient intra-prediction allows reducing the amount of residual information that needs to be encoded and transmitted, thus reducing the overall bit rate of an associated bit stream.

In a first possible implementation of the method according to the third aspect, the video comprises non-spherical video and the prediction line comprises a straight line.

In a second possible implementation of the method according to the third aspect, the video comprises spherical video and the prediction line comprises a geodesic curve.

In a third possible implementation of the method according to the third aspect as such or according to any of the preceding implementations of the third aspect, the intra-prediction is performed along the prediction line for every pixel of the current block to be encoded.

In a fourth possible implementation of the method according to the third aspect as such or according to any of the preceding implementations of the third aspect, the intra-prediction is performed by using a directional mode closest to the prediction line.

In a fifth possible implementation of the method according to the third aspect as such or according to any of the preceding implementations of the third aspect, the intra-prediction is performed along pixel-specific predetermined prediction lines originating in the predetermined vanishing point for the current block to be encoded. Using pixel-specific prediction lines allows enhanced prediction accuracy.

In a sixth possible implementation of the method according to the third aspect as such or according to any of the preceding implementations of the third aspect, an identical identifier is assigned for each prediction line originating in a same predetermined vanishing point.

In a seventh possible implementation of the method according to the third aspect as such or according to any of the preceding implementations of the third aspect, a first indicator is used to indicate whether to perform the intra-prediction based on the prediction line originating in the predetermined vanishing point.

In an eighth possible implementation of the method according to the third aspect as such or according to any of the preceding implementations of the third aspect, the intra-prediction is performed based on one of at least two vanishing points for at least one of the received frames of video.

In a ninth possible implementation of the method according to the eighth implementation of the third aspect, a second indicator is used to indicate which particular vanishing point is used to define the prediction line(s) for a given block.

According to a fourth aspect a method of decoding video is provided, the method comprising: receiving an encoded bit stream representing frames of video, each of the frames comprising blocks of pixels; for a current block to be decoded, obtaining a vanishing point from the bitstream and calculating pixel values of the current block to be decoded by performing intra-prediction based on a prediction line originating in the vanishing point; and providing decoded video based on the calculated pixel values. Using vanishing points in the intra-prediction allows savings in signaling and better prediction accuracy, thereby allowing more efficient intra-prediction for video. More efficient intra-prediction allows reducing the amount of residual information that needs to be encoded and transmitted, thus reducing the overall bit rate of an associated bit stream.

In a first possible implementation of the method according to the fourth aspect, the video comprises non-spherical video and the prediction line comprises a straight line.

In a second possible implementation of the method according to the fourth aspect, the video comprises spherical video and the prediction line comprises a geodesic curve.

In a third possible implementation of the method according to the fourth aspect as such or according to any of the preceding implementations of the fourth aspect, the intra-prediction is performed along the prediction line for every pixel of the current block to be decoded.

In a fourth possible implementation of the method according to the fourth aspect as such or according to any of the preceding implementations of the fourth aspect, the intra-prediction is performed by using a directional mode closest to the prediction line.

In a fifth possible implementation of the method according to the fourth aspect as such or according to any of the preceding implementations of the fourth aspect, the intra-prediction is performed along pixel-specific prediction lines originating in the vanishing point.

In a sixth possible implementation of the method according to the fourth aspect as such or according to any of the preceding implementations of the fourth aspect, a first indicator is used to determine whether to perform the intra-prediction based on the prediction line originating in the vanishing point.

In a seventh possible implementation of the method according to the fourth aspect as such or according to any of the preceding implementations of the fourth aspect, the intra-prediction is performed based on one of at least two vanishing points for at least one of the frames of video represented by the received encoded bit stream.

In an eighth possible implementation of the method according to the eighth implementation of the fourth aspect, a second indicator is used to determine which particular vanishing point is used to define the prediction line(s) for a given block.

In a fifth aspect, a computer program comprising program code is configured to perform the method according to the third or fourth aspect when the computer program is executed on a computer.

DESCRIPTION OF THE DRAWINGS

The above mentioned aspects will be better understood from the following detailed description and the accompanying drawings, wherein.

Like references are used to designate like parts in the accompanying drawings.

DETAILED DESCRIPTION

The detailed description provided below in connection with the appended drawings is intended as a description of the embodiments and is not intended to represent the only forms in which the embodiments may be constructed or utilized. However, the same or equivalent functions and structures may be accomplished by different embodiments.

In the following description, video coding arrangements and schemes are discussed in which at least some intra-prediction operations are performed based on a prediction line originating in a vanishing point.

Figure 9:
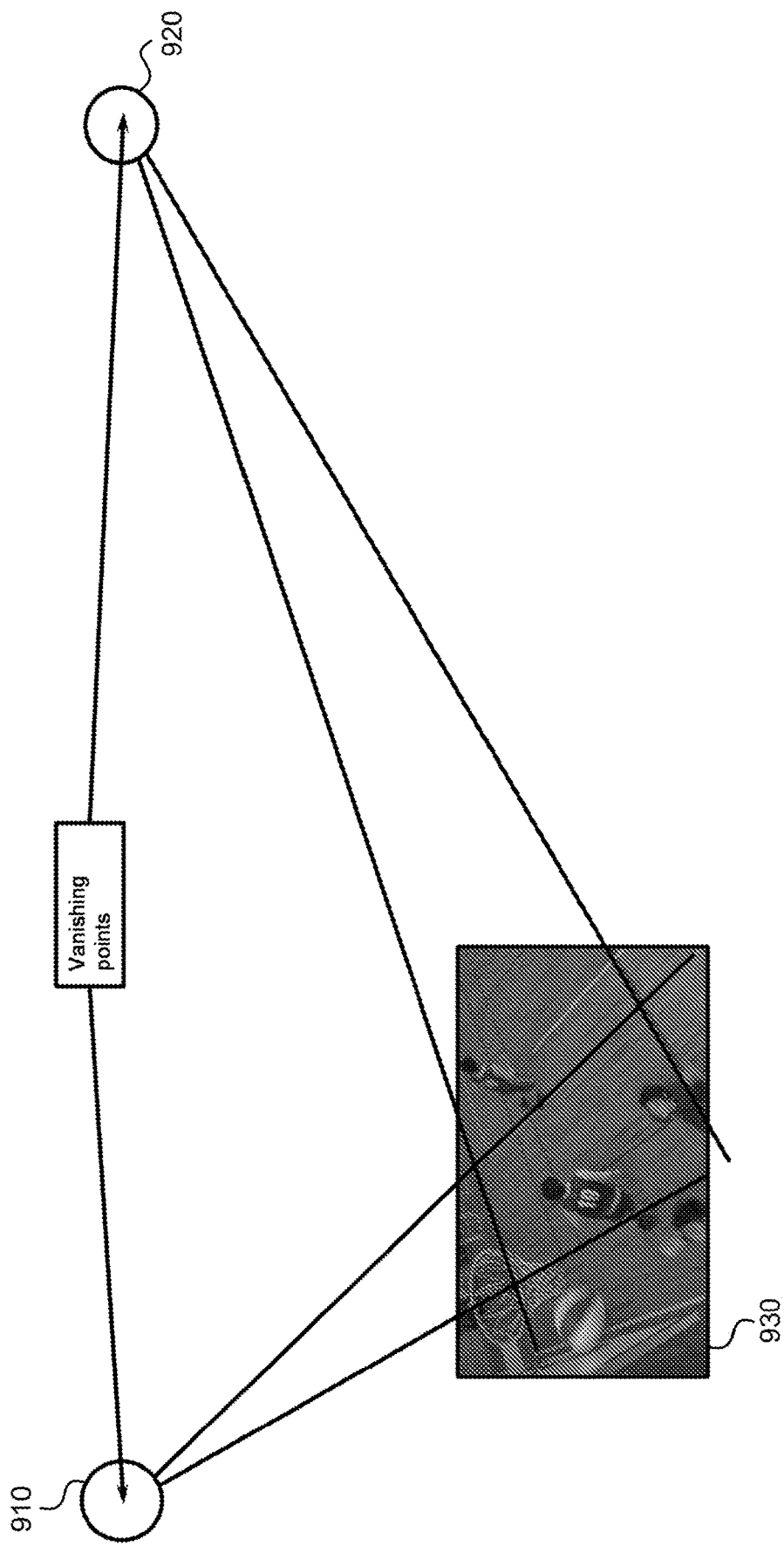
FIG. 9 illustrates an example of vanishing points.
Figure 10:
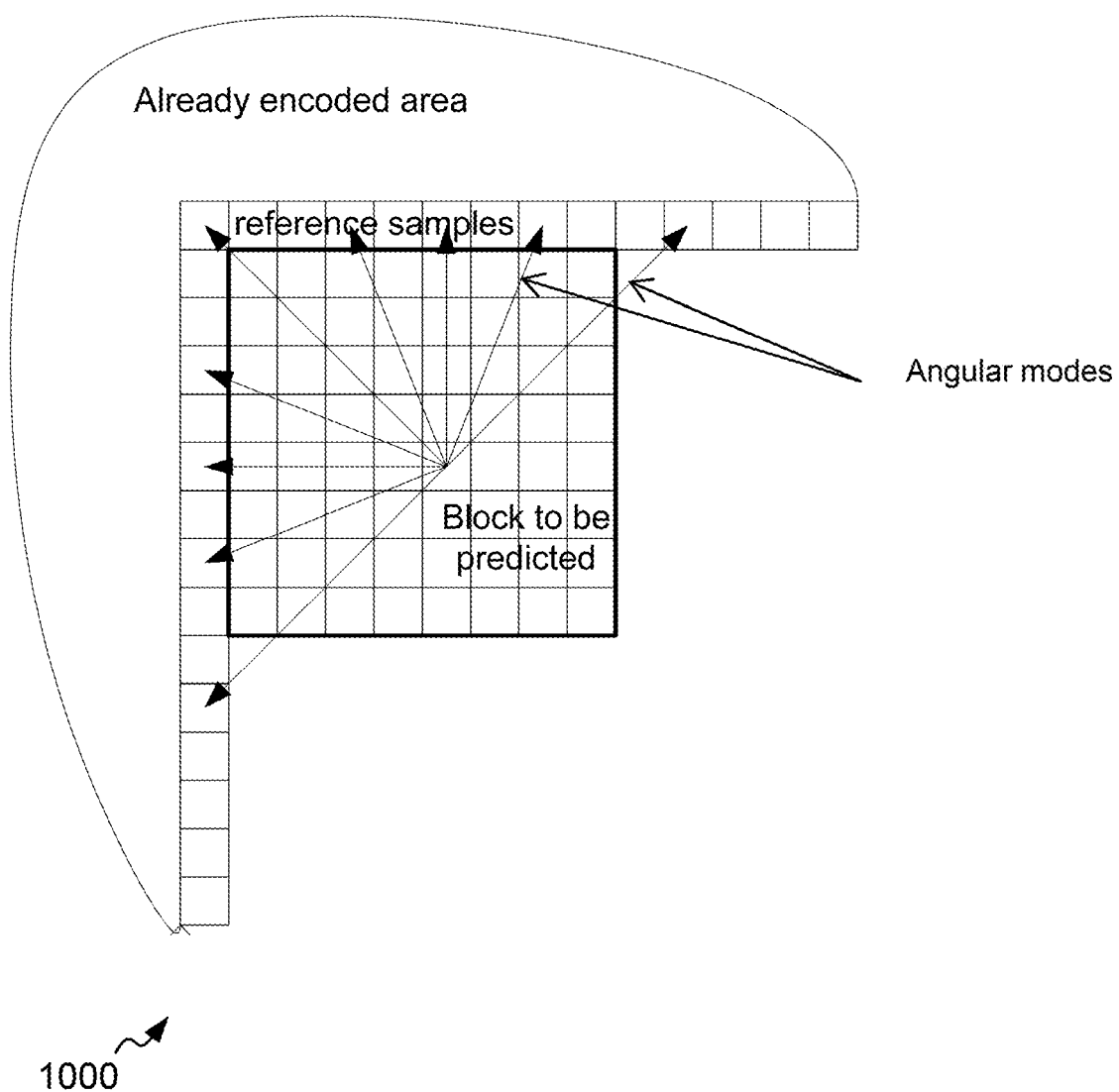
FIG. 10 illustrates an example of prior art intra-prediction.
Figure 11:
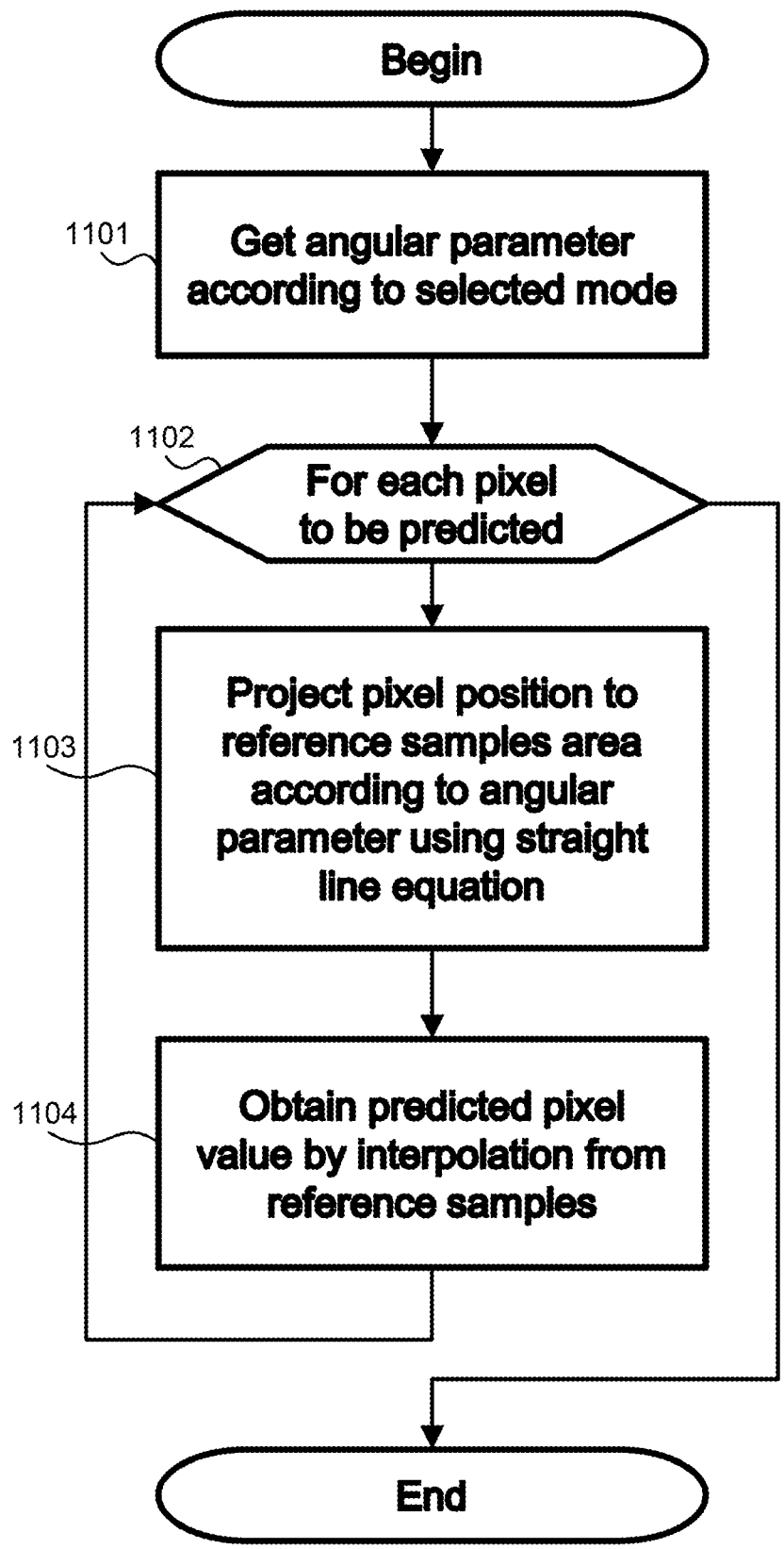
FIG. 11 a flow chart illustrating an example of prior art angular intra-prediction.

In the art of perspective, the term "vanishing point" refers to a point in the picture plane in which parallel lines in space seem to converge. The man-created world (or so called "Manhattan world") contains many parallel lines. For example, buildings, walls, windows, streets and the like contain parallel lines. According to perspective rules, they converge in a vanishing point. These are illustrated in FIG. 9 with vanishing points 910, 920 associated with image 930.

Once the position of the vanishing point is known, perspective lines can be drawn from any point in an image. That means that it is not necessary to know (and to signal to a decoder) angle parameters of those lines. It is only necessary to know whether or not a current line runs to the vanishing point. If the line runs to the vanishing point, it is not necessary to signal an angle of that line.

During a decoding process, taking the position of a current pixel in the image and knowing the position of the vanishing point, allows deriving the equation of the line running through these two points and performing intra-prediction along this line. An additional presumption may be made that in the Manhattan world there is at least one dominant direction of parallel lines and one vanishing point where they cross.

Figure 1A:
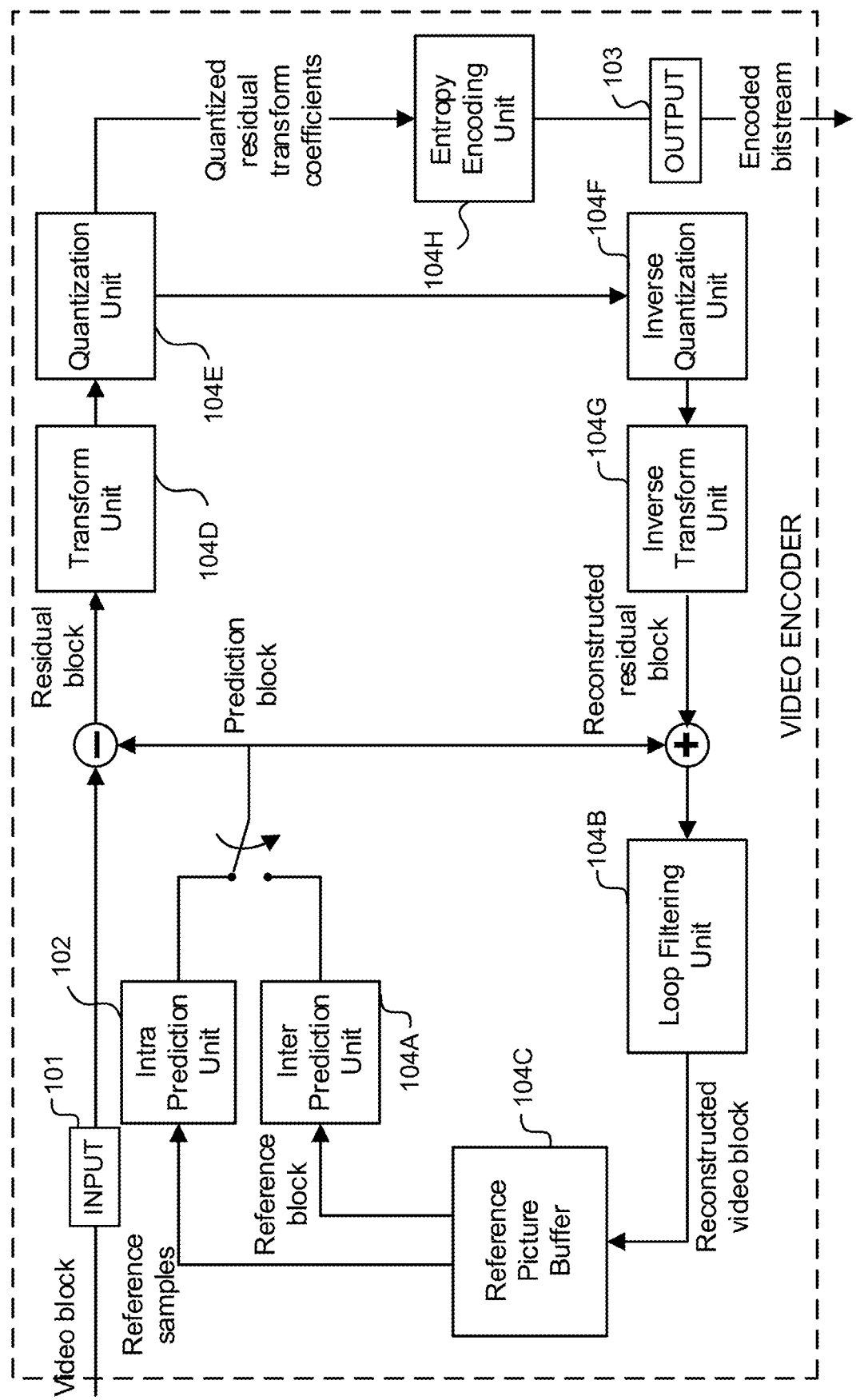
FIG. 1A is a block diagram illustrating a video encoder according to an example.

FIG. 1A is a block diagram that illustrates a video encoder 100 according to an example. The video encoder 100 may be implemented as a standalone device or it may be implemented as a part of another device, such as a digital video camera (including e.g. 360-degree cameras and camera rigs) or the like. Furthermore, the video encoder 100 may be implemented as hardware (including but not limited to: a processor and/or a memory, and the like), software, or any combination of hardware and software.

The video encoder 100 comprises an input unit 101 that is configured to receive frames of video. Each of the frames comprises blocks of pixels. The video may comprise non-spherical video in which case the prediction line comprises a straight line.

Alternatively, the video may comprise spherical video in which case the prediction line comprises a geodesic curve. The geodesic curve with its curvature may correspond to a straight line in a three-dimensional scene represented by the spherical video.

The video encoder 100 further comprises an intra-prediction unit 102 that is configured to generate a set of residuals for a current block to be encoded, by performing intra-prediction at least partially based on a predetermined prediction line originating in a predetermined vanishing point for the current block to be encoded.

The vanishing point to use may be determined by, e.g., the intra-prediction unit 102 (or by any other suitable entity) before generating the set of residuals. Furthermore, the prediction line may be determined by the intra-prediction unit 102 (or by any other suitable entity) on the basis of the determined vanishing point.

The video encoder 100 further comprises an output unit 103 that is configured to provide an encoded bit stream based on sets of residuals generated by the intra-prediction performed on the blocks to be encoded. In addition to residuals related data, the bit stream may comprise e.g. partitioning flags, prediction parameters, information on the determined vanishing point(s), information on the determined prediction line(s), and the like.

The intra-prediction unit 102 may be further configured to perform the intra-prediction along a single predetermined prediction line originating in the predetermined vanishing point for the current block to be encoded.

The intra-prediction unit 102 may be further configured to perform the intra-prediction by using a directional mode closest to a single predetermined prediction line originating in the predetermined vanishing point for the current block to be encoded.

The intra-prediction unit 102 may be further configured to perform the intra-prediction along pixel-specific predetermined prediction lines originating in the predetermined vanishing point for the current block to be encoded.

The intra-prediction unit 102 may be further configured to assign an identical identifier for each prediction line originating in a same predetermined vanishing point.

The intra-prediction unit 102 may be further configured to use a first indicator to indicate whether to perform the intra-prediction based on the prediction line originating in the predetermined vanishing point.

The intra-prediction unit 102 may be further configured to perform the intra-prediction based on one of at least two vanishing points for at least one of the received frames of video. For example, in a first image block the intra-prediction may be based on a first vanishing point, and in a second image block the intra-prediction may be based on a second vanishing point. Furthermore, the intra-prediction unit 102 may be configured to use a second indicator to indicate which particular vanishing point of the at least two vanishing points is used to define the prediction lines for a given block.

The video encoder 100 may further comprise other elements, such as an inter-prediction unit 104A, a loop filtering unit 104B, a reference picture buffer 104C, a transform unit 104D, a quantization unit 104E, an inverse quantization unit 104F, an inverse transform unit 104G, and/or an entropy encoding unit 104H, or the like.

Figure 1B:
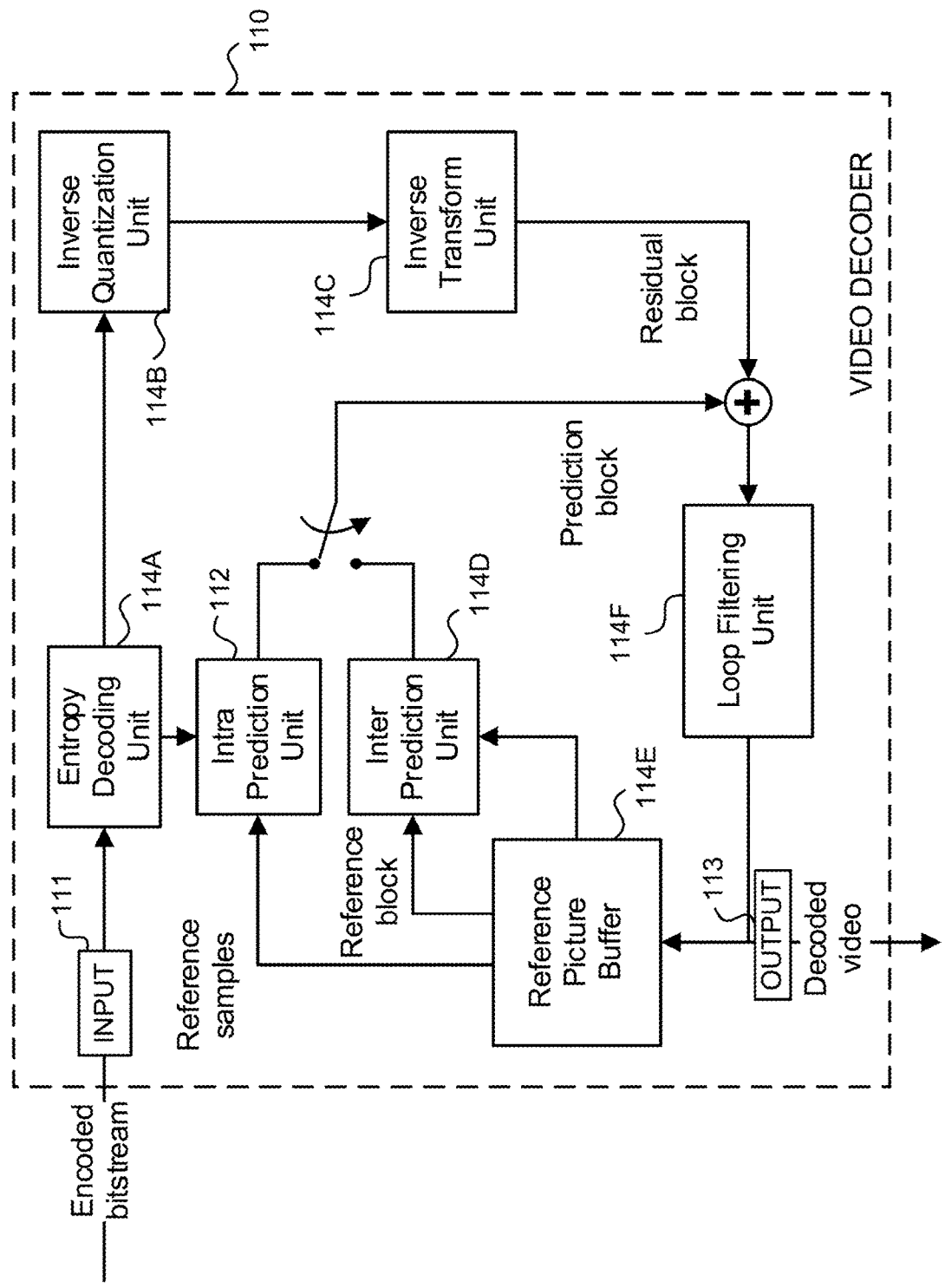
FIG. 1B is a block diagram illustrating a video decoder according to an example.

FIG. 1B is a block diagram that illustrates a video decoder 110 according to an example. The video decoder 110 may be implemented as a standalone device or it may be implemented as a part of another device, such as a display device (including e.g. a head-mounted display suitable for displaying virtual reality content) or the like. Furthermore, the video decoder 110 may be implemented as hardware (including but not limited to: a processor and/or a memory, and the like), software, or any combination of hardware and software.

The video decoder 110 comprises an input unit 111 that is configured to receive an encoded bit stream representing frames of video. Each of the frames comprises blocks of pixels. In addition to residuals related data, the bit stream may comprise e.g. partitioning flags, prediction parameters, information on the determined vanishing point(s), information on the determined prediction line(s), and the like.

The video decoder 110 further comprises an intra-prediction unit 112 that is configured to determine a set of pixel values for a current block to be decoded, by performing intra-prediction at least partially based on a predetermined prediction line originating in a predetermined vanishing point for the current block to be decoded. As with the video encoder 100 of FIG. 1A, the video may comprise non-spherical video in which case the prediction line comprises a straight line, or the video may comprise spherical video in which case the prediction line comprises a geodesic curve.

The vanishing point to use may be determined e.g. by the intra-prediction unit 112 (or by any other suitable entity and then received by the intra-prediction unit 112) before generating the set of residuals. Furthermore, the prediction line may be determined by the intra-prediction unit 112 (or by any other suitable entity and then received by the intra-prediction unit 112) on the basis of the determined vanishing point.

The video decoder 110 further comprises an output unit 113 that is configured to provide decoded video based on the sets of pixel values determined by the intra-prediction performed on the blocks to be decoded.

The intra-prediction unit 112 may be further configured to perform the intra-prediction along a single predetermined prediction line originating in the predetermined vanishing point for the current block to be decoded.

The intra-prediction unit 112 may be further configured to perform the intra-prediction by using a directional mode closest to a single predetermined prediction line originating in the predetermined vanishing point for the current block to be decoded.

The intra-prediction unit 112 may be further configured to perform the intra-prediction along pixel-specific predetermined prediction lines originating in the predetermined vanishing point for the current block to be decoded.

The intra-prediction unit 112 may be further configured to use a first indicator to determine whether to perform the intra-prediction based on the prediction line originating in the predetermined vanishing point.

The intra-prediction unit 112 may be further configured to perform the intra-prediction based on one of at least two vanishing points for at least one of the frames of video represented by the received encoded bit stream. Furthermore, the intra-prediction unit 112 may be configured to use a second indicator to determine which particular vanishing point is used to define the prediction line(s) for a given block.

The video decoder 110 may further comprise other elements, such as an entropy decoding unit 114A, an inverse quantization unit 114B, an inverse transform unit 114C, an inter-prediction unit 114D, a reference picture buffer 114E, and/or a loop filtering unit 114F, or the like.

In the following examples of FIGS. 2A to 2F, the video encoder may comprise the video encoder 100 of FIG. 1A. Furthermore, in the examples of FIGS. 3A to 3F, the video decoder may comprise the video decoder 110 of FIG. 1B. Some of the features of the described devices and methods are optional features which provide further advantages.

Figure 2A:
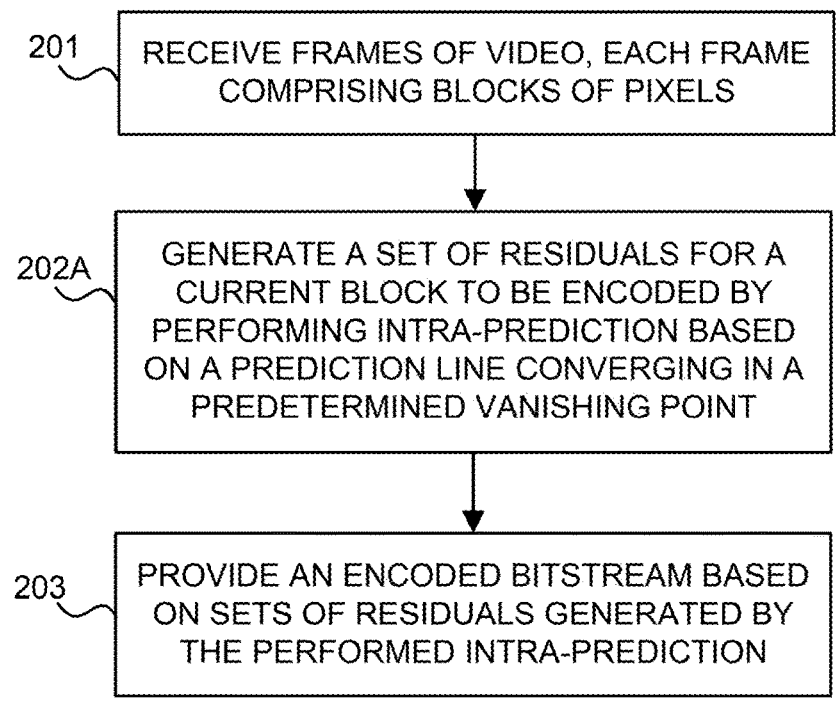
FIG. 2A is a flow chart illustrating a method according to an example.

FIG. 2A is a flow chart illustrating a method of encoding video according to an example. At operation 201, an input unit of a video encoder receives frames of video. Each of the frames comprises blocks of pixels. As discussed above, the video may comprise non-spherical video in which case the prediction line comprises a straight line, or the video may comprise spherical video in which case the prediction line comprises a geodesic curve.

At operation 202A, an intra-prediction unit of the video encoder generates a set of residuals for a current block to be encoded, by performing intra-prediction at least partially based on a predetermined prediction line originating in a predetermined vanishing point for the current block to be encoded.

As discussed above, the vanishing point to use may be determined e.g. by the intra-prediction unit of the video encoder (or by any other suitable entity) before generating the set of residuals. Furthermore, the prediction line may be determined by the intra-prediction unit of the video encoder (or by any other suitable entity) on the basis of the determined vanishing point.

At operation 203, an output unit of the video encoder provides an encoded bit stream based on sets of residuals generated by the intra-prediction performed on the blocks to be encoded. In addition to residuals related data, the bit stream may comprise e.g. partitioning flags, prediction parameters, information on the determined vanishing point(s), information on the determined prediction line(s), and the like.

Figure 2B:
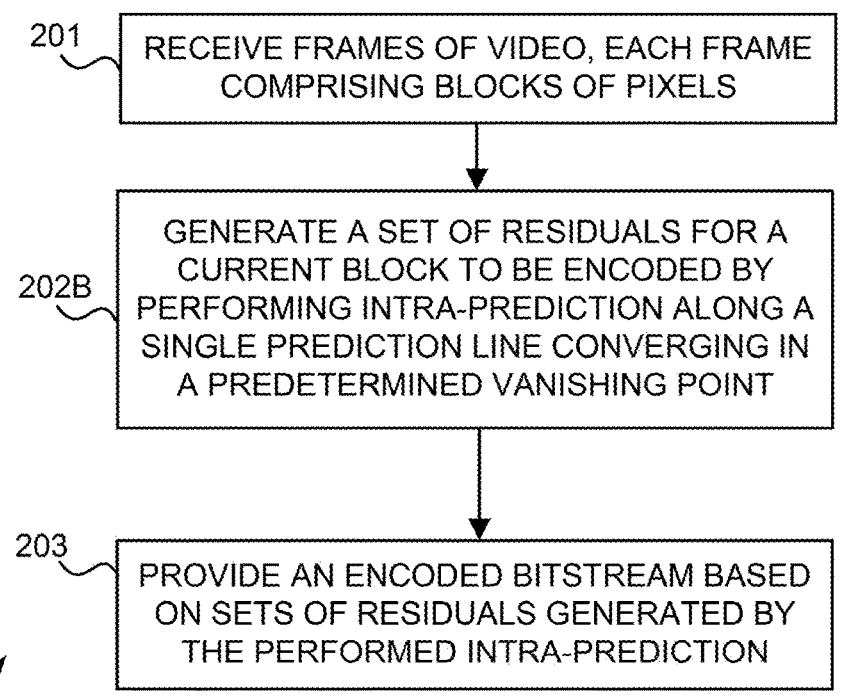
FIG. 2B is a flow chart illustrating a method according to an example.

FIG. 2B is a flow chart illustrating a method of encoding video according to an example. At operation 201, an input unit of a video encoder receives frames of video. Each of the frames comprises blocks of pixels. As discussed above, the video may comprise non-spherical video in which case the prediction line comprises a straight line, or the video may comprise spherical video in which case the prediction line comprises a geodesic curve.

At operation 202B, an intra-prediction unit of the video encoder generates a set of residuals for a current block to be encoded, by performing intra-prediction at least partially along a single predetermined prediction line originating in the predetermined vanishing point for the current block to be encoded.

As discussed above, the vanishing point to use may be determined e.g. by the intra-prediction unit of the video encoder (or by any other suitable entity) before generating the set of residuals. Furthermore, the prediction line may be determined by the intra-prediction unit of the video encoder (or by any other suitable entity) on the basis of the determined vanishing point. An identical identifier may be assigned for each prediction line originating in a same predetermined vanishing point.

At operation 203, an output unit of the video encoder provides an encoded bit stream based on sets of residuals generated by the intra-prediction performed on the blocks to be encoded. In addition to residuals related data, the bit stream may comprise e.g. partitioning flags, prediction parameters, information on the determined vanishing point (s), information on the determined prediction line(s), and the like.

Figure 2C:
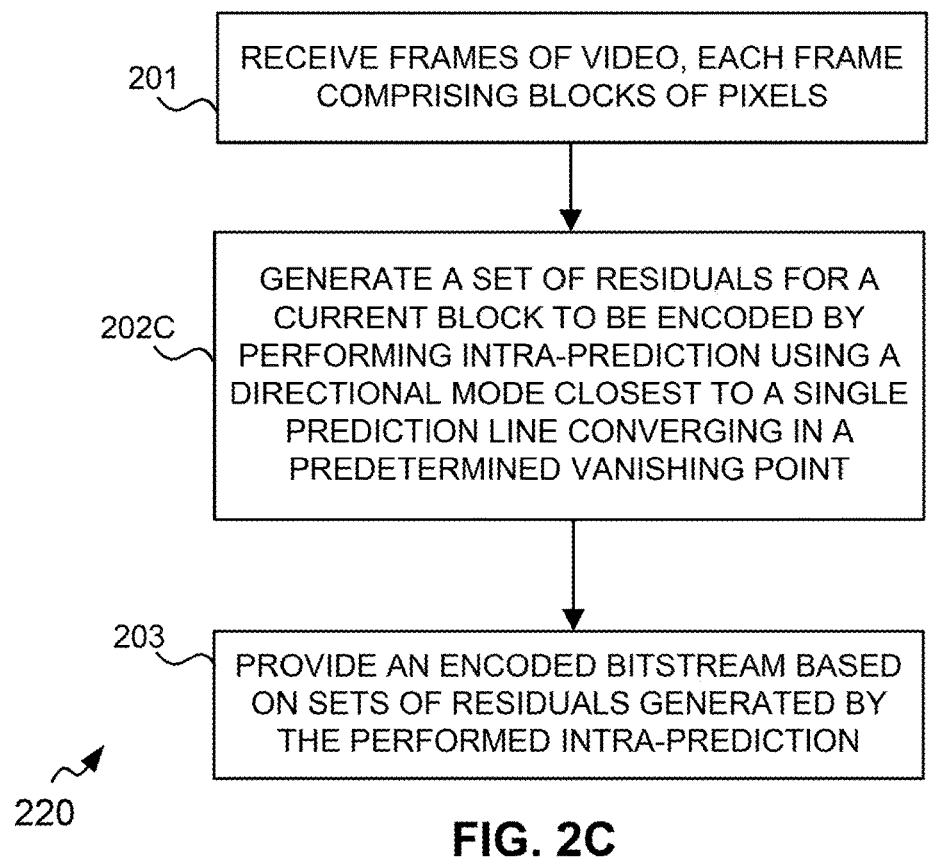
FIG. 2C is a flow chart illustrating a method according to an example.

FIG. 2C is a flow chart illustrating a method of encoding video according to an example. At operation 201, an input unit of a video encoder receives frames of video. Each of the frames comprises blocks of pixels. As discussed above, the video may comprise non-spherical video in which case the prediction line comprises a straight line, or the video may comprise spherical video in which case the prediction line comprises a geodesic curve.

At operation 202C, an intra-prediction unit of the video encoder generates a set of residuals for a current block to be encoded, by performing intra-prediction at least partially by using a directional mode closest to a single predetermined prediction line originating in the predetermined vanishing point for the current block to be encoded.

As discussed above, the vanishing point to use may be determined e.g. by the intra-prediction unit of the video encoder (or by any other suitable entity) before generating the set of residuals. Furthermore, the prediction line may be determined by the intra-prediction unit of the video encoder (or by any other suitable entity) on the basis of the determined vanishing point. An identical identifier may be assigned for each prediction line originating in a same predetermined vanishing point.

At operation 203, an output unit of the video encoder provides an encoded bit stream based on sets of residuals generated by the intra-prediction performed on the blocks to be encoded. In addition to residuals related data, the bit stream may comprise e.g. partitioning flags, prediction parameters, information on the determined vanishing point (s), information on the determined prediction line(s), and the like.

Figure 2D:
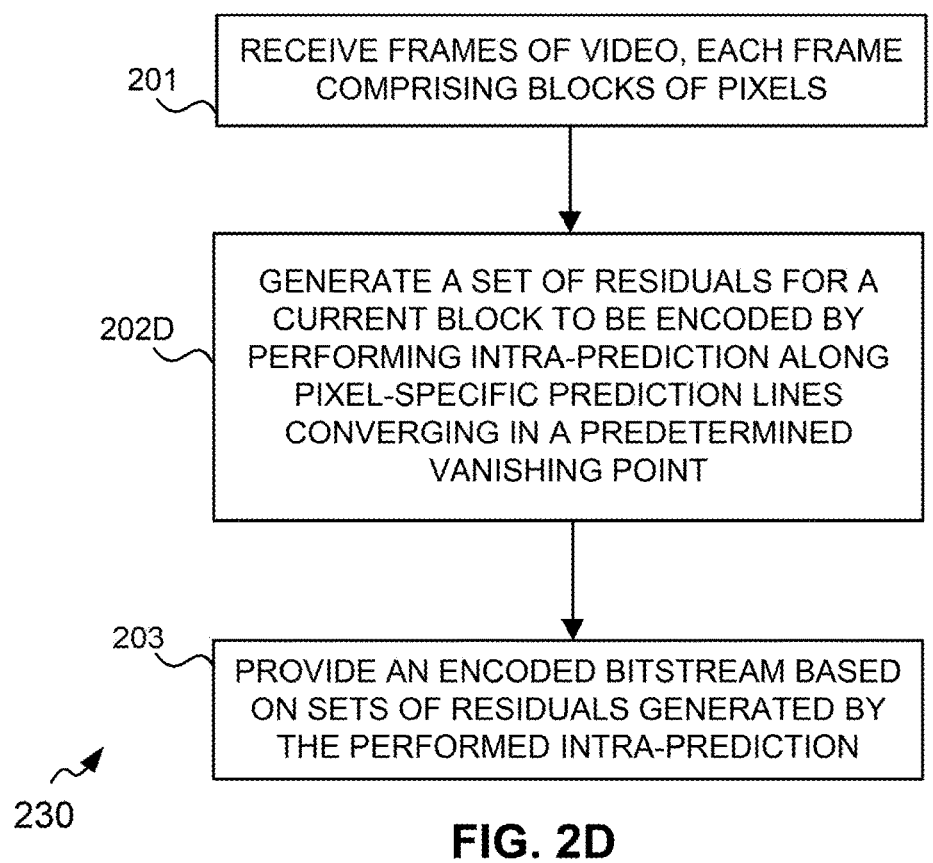
FIG. 2D is a flow chart illustrating a method according to an example.

FIG. 2D is a flow chart illustrating a method of encoding video according to an example. At operation 201, an input unit of a video encoder receives frames of video. Each of the frames comprises blocks of pixels. As discussed above, the video may comprise non-spherical video in which case the prediction line comprises a straight line, or the video may comprise spherical video in which case the prediction line comprises a geodesic curve.

At operation 202D, an intra-prediction unit of the video encoder generates a set of residuals for a current block to be encoded, by performing intra-prediction at least partially along pixel-specific predetermined prediction lines originating in the predetermined vanishing point for the current block to be encoded.

As discussed above, the vanishing point to use may be determined e.g. by the intra-prediction unit of the video encoder (or by any other suitable entity) before generating the set of residuals. Furthermore, the prediction line may be determined by the intra-prediction unit of the video encoder (or by any other suitable entity) on the basis of the determined vanishing point. An identical identifier may be assigned for each prediction line originating in a same predetermined vanishing point.

At operation 203, an output unit of the video encoder provides an encoded bit stream based on sets of residuals generated by the intra-prediction performed on the blocks to be encoded. In addition to residuals related data, the bit stream may comprise e.g. partitioning flags, prediction parameters, information on the determined vanishing point (s), information on the determined prediction line(s), and the like.

Figure 2E:
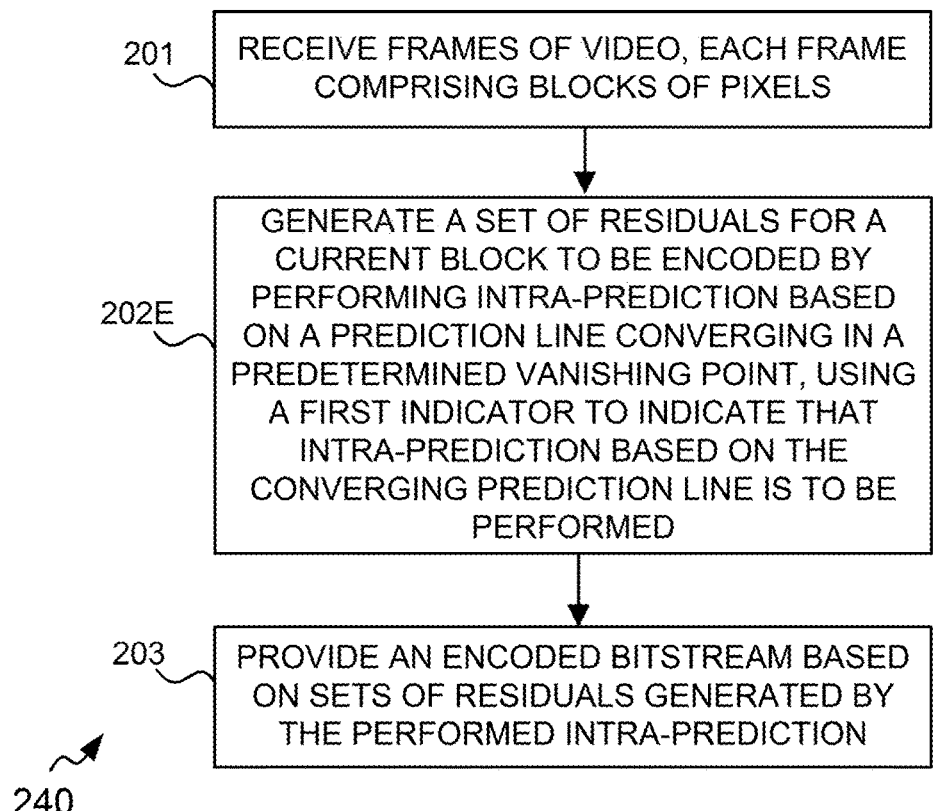
FIG. 2E is a flow chart illustrating a method according to an example.

FIG. 2E is a flow chart illustrating a method of encoding video according to an example. At operation 201, an input unit of a video encoder receives frames of video. Each of the frames comprises blocks of pixels. As discussed above, the video may comprise non-spherical video in which case the prediction line comprises a straight line, or the video may comprise spherical video in which case the prediction line comprises a geodesic curve.

At operation 202E, an intra-prediction unit of the video encoder generates a set of residuals for a current block to be encoded, by performing intra-prediction at least partially based on a predetermined prediction line originating in a predetermined vanishing point for the current block to be encoded, using a first indicator to indicate to a receiving entity whether to perform the intra-prediction based on the prediction line originating in the predetermined vanishing point.

As discussed above, the vanishing point to use may be determined e.g. by the intra-prediction unit of the video encoder (or by any other suitable entity) before generating the set of residuals. Furthermore, the prediction line may be determined by the intra-prediction unit of the video encoder (or by any other suitable entity) on the basis of the determined vanishing point. An identical identifier may be assigned for each prediction line originating in a same predetermined vanishing point.

At operation 203, an output unit of the video encoder provides an encoded bit stream based on sets of residuals generated by the intra-prediction performed on the blocks to be encoded. In addition to residuals related data, the bit stream may comprise e.g. partitioning flags, prediction parameters, information on the determined vanishing point (s), information on the determined prediction line(s), and the like.

Figure 2F:
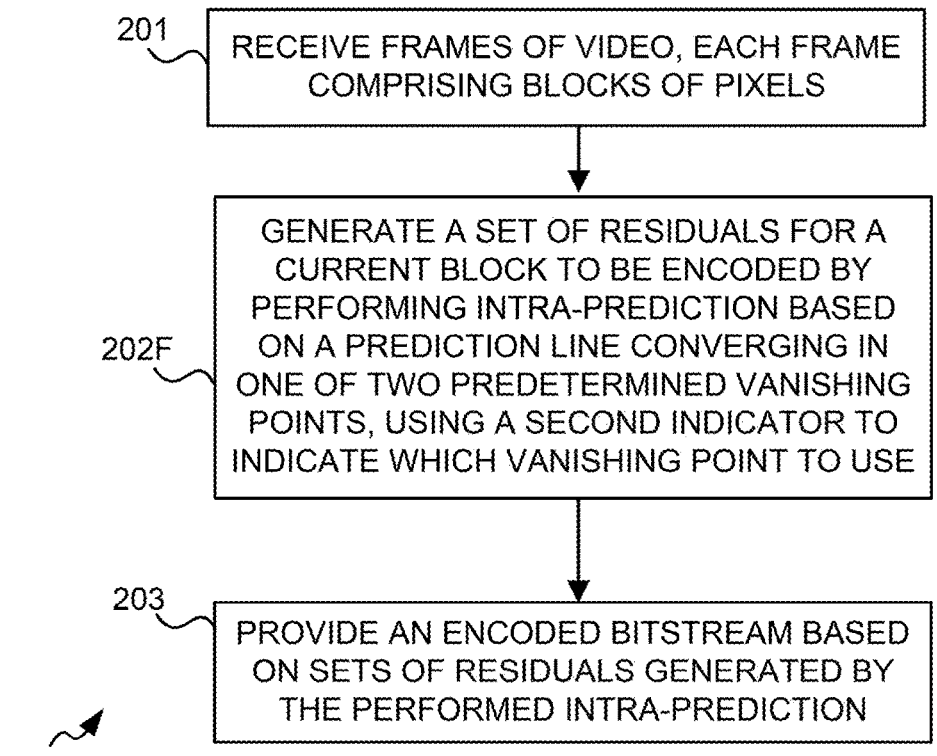
FIG. 2F is a flow chart illustrating a method according to an example.

FIG. 2F is a flow chart illustrating a method of encoding video according to an example. At operation 201, an input unit of a video encoder receives frames of video. Each of the frames comprises blocks of pixels. As discussed above, the video may comprise non-spherical video in which case the prediction line comprises a straight line, or the video may comprise spherical video in which case the prediction line comprises a geodesic curve.

At operation 202F, an intra-prediction unit of the video encoder generates a set of residuals for a current block to be encoded, by performing intra-prediction at least partially based on a predetermined prediction line originating in a predetermined vanishing point for the current block to be encoded. Here, the intra-prediction is performed based on one of at least two vanishing points for at least one of the received frames of video, and a second indicator is used to indicate which particular vanishing point is used to define the prediction line.

As discussed above, the vanishing point to use may be determined e.g. by the intra-prediction unit of the video encoder (or by any other suitable entity) before generating the set of residuals. Furthermore, the prediction line may be determined by the intra-prediction unit of the video encoder (or by any other suitable entity) on the basis of the determined vanishing point. An identical identifier may be assigned for each prediction line originating in a same predetermined vanishing point.

At operation 203, an output unit of the video encoder provides an encoded bit stream based on sets of residuals generated by the intra-prediction performed on the blocks to be encoded. In addition to residuals related data, the bit stream may comprise e.g. partitioning flags, prediction parameters, information on the determined vanishing point(s), information on the determined prediction line(s), and the like.

Figure 3A:
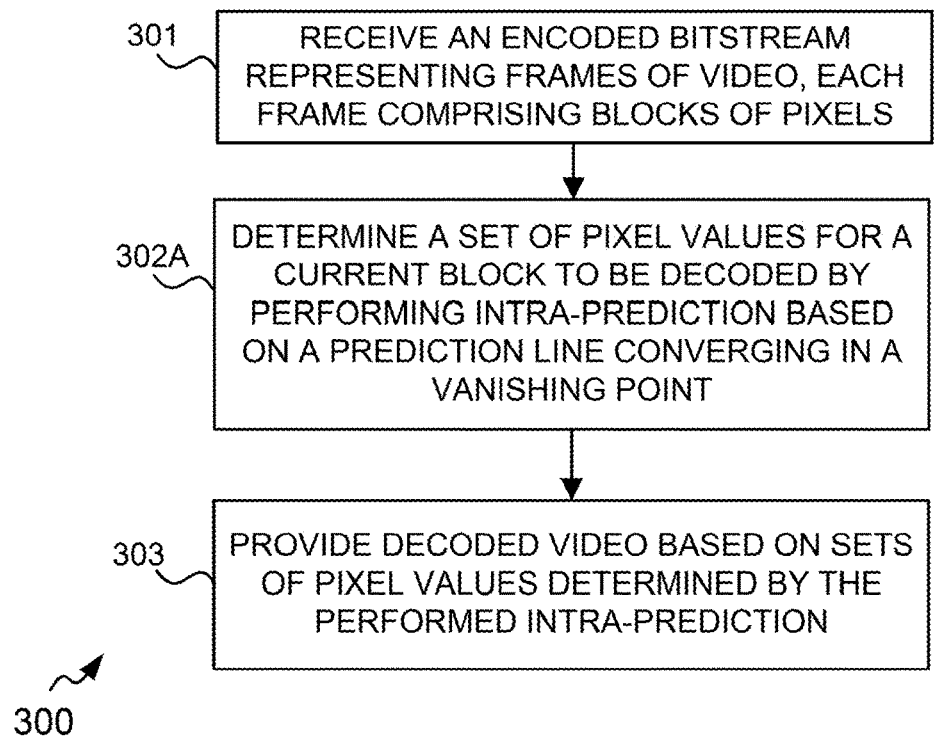
FIG. 3A is a flow chart illustrating a method according to an example.

FIG. 3A is a flow chart illustrating a method of decoding video according to an example. At operation 301, an input unit of a video decoder receives an encoded bit stream representing frames of video. Each of the frames comprises blocks of pixels. In addition to residuals related data, the bit stream may comprise e.g. one or more of the following: partitioning flags, prediction parameters, information on one or more vanishing point(s), information on one or more prediction line(s), and the like.

At operation 302A, an intra-prediction unit of the video decoder determines a set of pixel values for a current block to be decoded, by performing intra-prediction at least partially based on a prediction line originating in a vanishing point for the current block to be decoded. The video may comprise non-spherical video in which case the prediction line comprises a straight line, or the video may comprise spherical video in which case the prediction line may comprise a geodesic curve.

The vanishing point to use may be determined e.g. by the intra-prediction unit of the video decoder (or by any other suitable entity and then received by the intra-prediction unit of the video decoder) before doing intra-prediction. Furthermore, the prediction line may be determined by the intra-prediction unit 112 (or by any other suitable entity and then received by the intra-prediction unit 112) on the basis of the determined vanishing point.

At operation 303, an output unit of the video decoder provides decoded video based on the sets of pixel values determined by the intra-prediction performed on the blocks to be decoded.

Figure 3B:
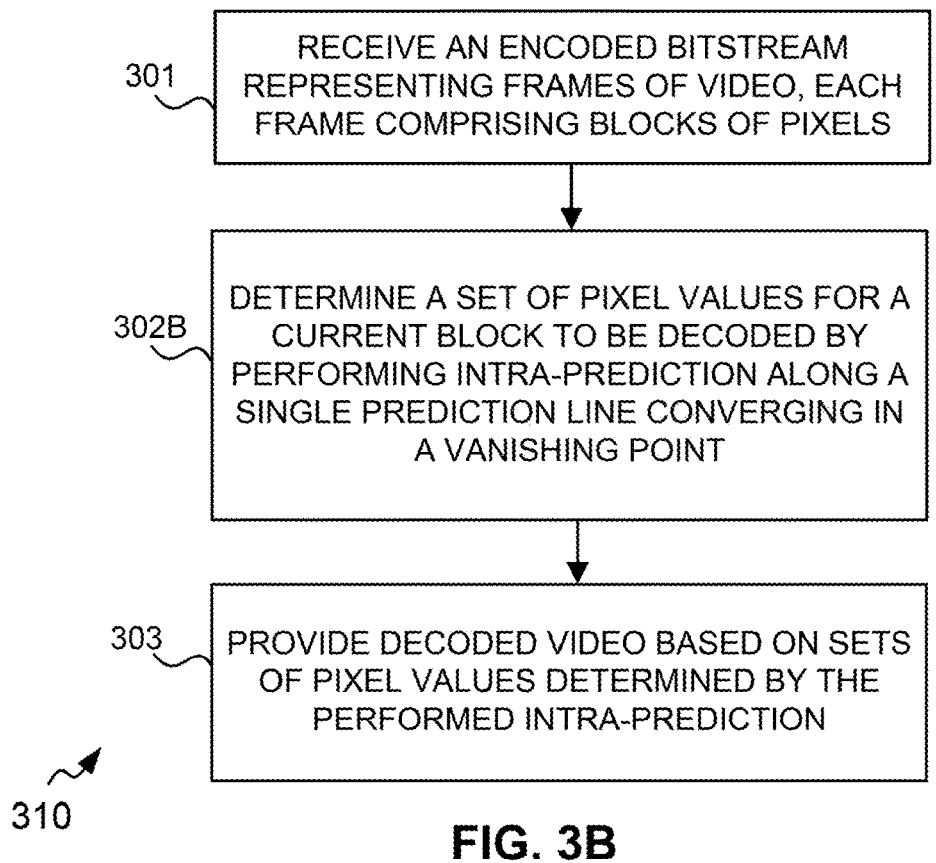
FIG. 3B is a flow chart illustrating a method according to an example.

FIG. 3B is a flow chart illustrating a method of decoding video according to an example. At operation 301, an input unit of a video decoder receives an encoded bit stream representing frames of video. Each of the frames comprises blocks of pixels. In addition to residuals related data, the bit stream may comprise e.g. one or more of the following: partitioning flags, prediction parameters, information on one or more vanishing point(s), information on one or more prediction line(s), and the like.

At operation 302B, an intra-prediction unit of the video decoder determines a set of pixel values for a current block to be decoded, by performing intra-prediction at least partially along a single prediction line originating in the vanishing point for the current block to be decoded. The video may comprise non-spherical video in which case the prediction line comprises a straight line, or the video may comprise spherical video in which case the prediction line comprises a geodesic curve.

The vanishing point to use may be determined e.g. by the intra-prediction unit of the video decoder (or by any other suitable entity and then received by the intra-prediction unit of the video decoder) before doing intra-prediction. Furthermore, the prediction line may be determined by the intra-prediction unit 112 (or by any other suitable entity and then received by the intra-prediction unit 112) on the basis of the determined vanishing point.

At operation 303, an output unit of the video decoder provides decoded video based on the sets of pixel values determined by the intra-prediction performed on the blocks to be decoded.

Figure 3C:
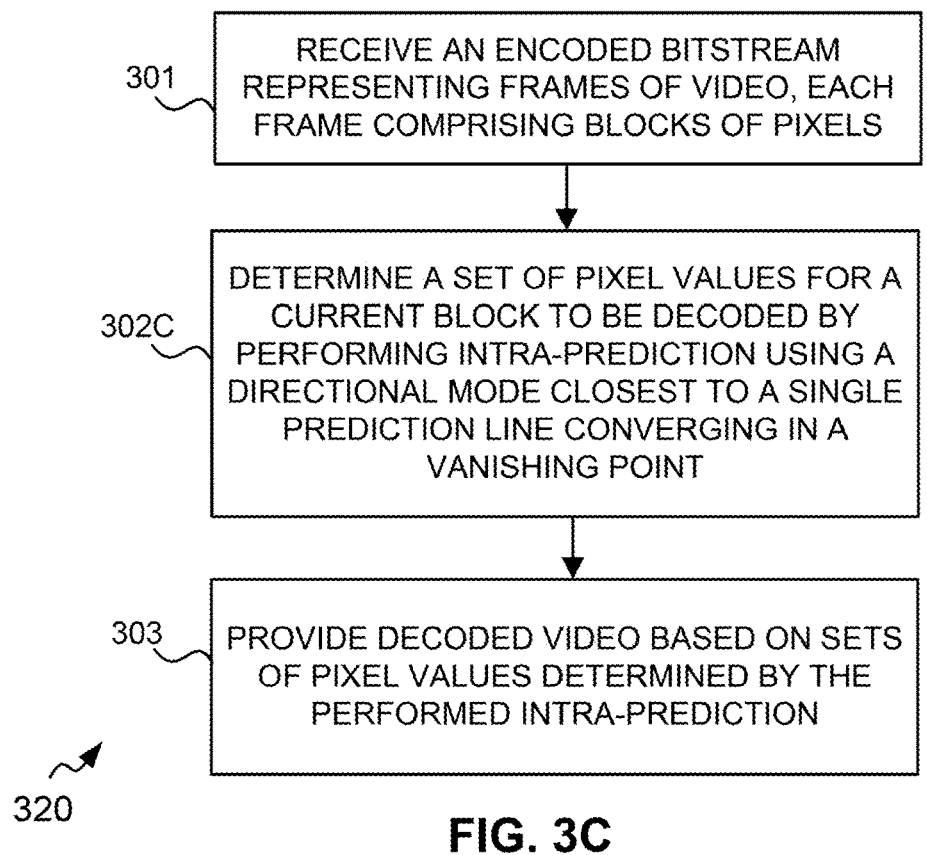
FIG. 3C is a flow chart illustrating a method according to an example.

FIG. 3C is a flow chart illustrating a method of decoding video according to an example. At operation 301, an input unit of a video decoder receives an encoded bit stream representing frames of video. Each of the frames comprises blocks of pixels. In addition to residuals related data, the bit stream may comprise e.g. one or more of the following: partitioning flags, prediction parameters, information on one or more vanishing point(s), information on one or more prediction line(s), and the like.

At operation 302C, an intra-prediction unit of the video decoder determines a set of pixel values for a current block to be decoded, by performing intra-prediction at least partially by using a directional mode closest to a single prediction line originating in the vanishing point for the current block to be decoded. The video may comprise non-spherical video in which case the prediction line comprises a straight line, or the video may comprise spherical video in which case the prediction line comprises a geodesic curve.

The vanishing point to use may be determined e.g. by the intra-prediction unit of the video decoder (or by any other suitable entity and then received by the intra-prediction unit of the video decoder) before doing intra-prediction. Furthermore, the prediction line may be determined by the intra-prediction unit 112 (or by any other suitable entity and then received by the intra-prediction unit 112) on the basis of the determined vanishing point.

At operation 303, an output unit of the video decoder provides decoded video based on the sets of pixel values determined by the intra-prediction performed on the blocks to be decoded.

Figure 3D:
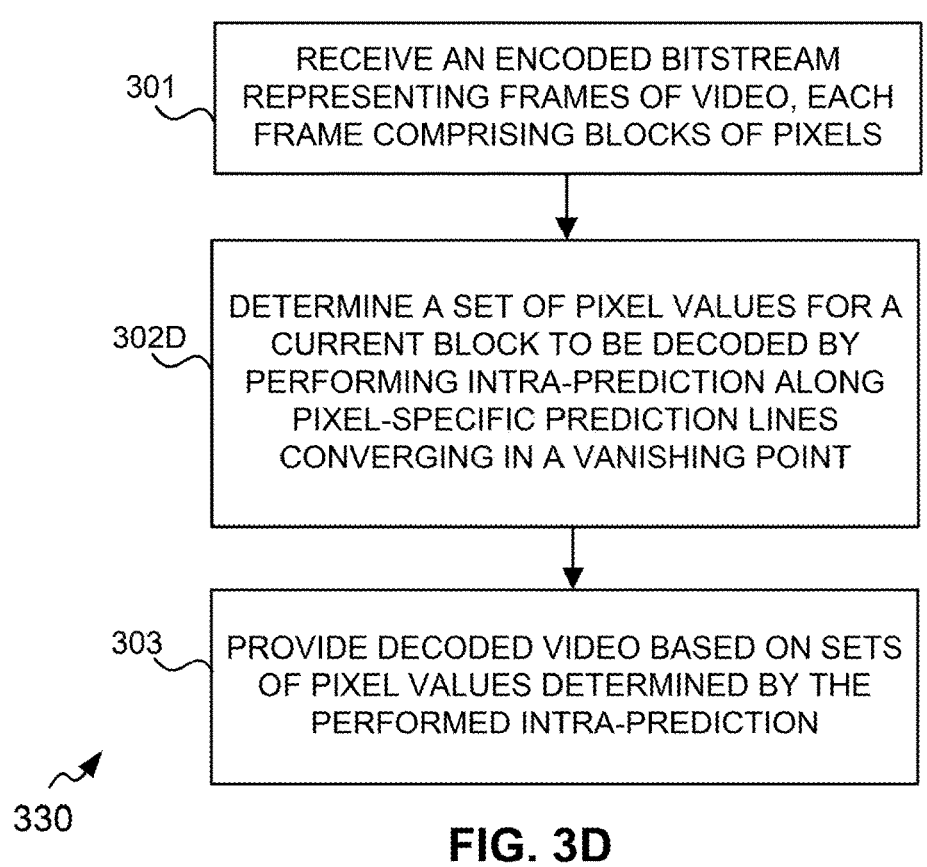
FIG. 3D is a flow chart illustrating a method according to an example.

FIG. 3D is a flow chart illustrating a method of decoding video according to an example. At operation 301, an input unit of a video decoder receives an encoded bit stream representing frames of video. Each of the frames comprises blocks of pixels. In addition to residuals related data, the bit stream may comprise e.g. one or more of the following: partitioning flags, prediction parameters, information on one or more vanishing point(s), information on one or more prediction line(s), and the like.

At operation 302D, an intra-prediction unit of the video decoder determines a set of pixel values for a current block to be decoded, by performing intra-prediction at least partially along pixel-specific prediction lines originating in the vanishing point for the current block to be decoded. The video may comprise non-spherical video in which case the prediction line comprises a straight line, or the video may comprise spherical video in which case the prediction line comprises a geodesic curve.

The vanishing point to use may be determined e.g. by the intra-prediction unit of the video decoder (or by any other suitable entity and then received by the intra-prediction unit of the video decoder) before doing intra-prediction. Furthermore, the prediction line may be determined by the intra-prediction unit 112 (or by any other suitable entity and then received by the intra-prediction unit 112) on the basis of the determined vanishing point.

At operation 303, an output unit of the video decoder provides decoded video based on the sets of pixel values determined by the intra-prediction performed on the blocks to be decoded.

Figure 3E:
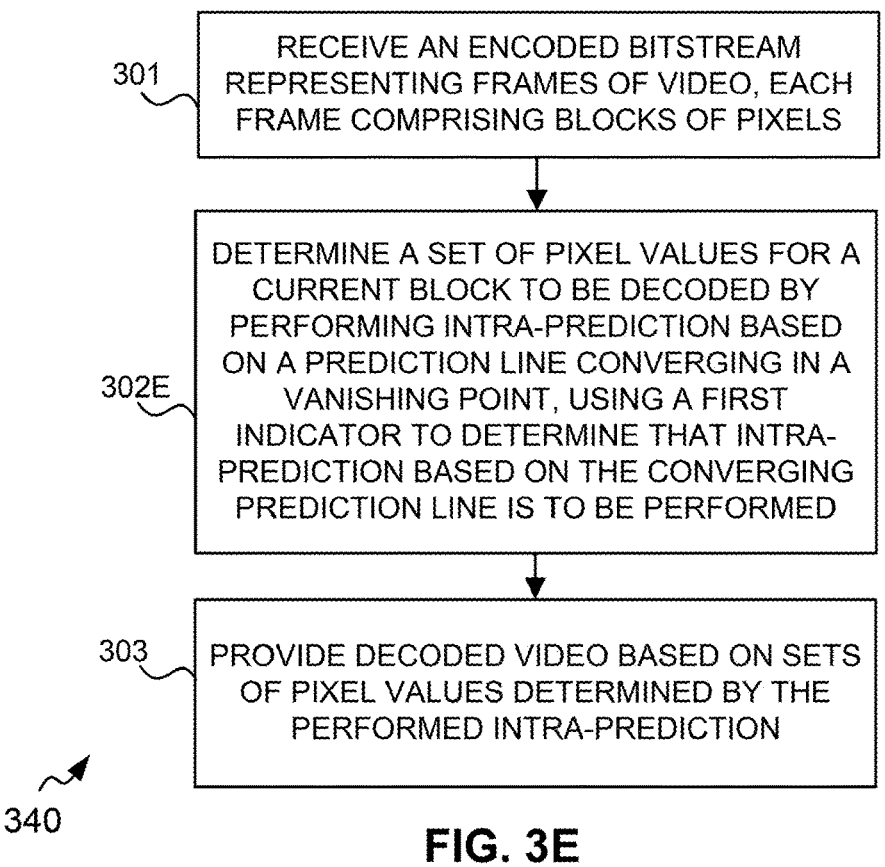
FIG. 3E is a flow chart illustrating a method according to an example.

FIG. 3E is a flow chart illustrating a method of decoding video according to an example. At operation 301, an input unit of a video decoder receives an encoded bit stream representing frames of video. Each of the frames comprises blocks of pixels. In addition to residuals related data, the bit stream may comprise e.g. one or more of the following: partitioning flags, prediction parameters, information on one or more vanishing point(s), information on one or more prediction line(s), and the like.

At operation 302E, an intra-prediction unit of the video decoder determines a set of pixel values for a current block to be decoded, by performing intra-prediction at least partially based on a prediction line originating in a vanishing point for the current block to be decoded, using a first indicator to determine whether to perform the intra-prediction based on the prediction line originating in the vanishing point. The video may comprise non-spherical video in which case the prediction line comprises a straight line, or the video may comprise spherical video in which case the prediction line comprises a geodesic curve.

The vanishing point to use may be determined e.g. by the intra-prediction unit of the video decoder (or by any other suitable entity and then received by the intra-prediction unit of the video decoder) before doing intra-prediction. Furthermore, the prediction line may be determined by the intra-prediction unit 112 (or by any other suitable entity and then received by the intra-prediction unit 112) on the basis of the determined vanishing point.

At operation 303, an output unit of the video decoder provides decoded video based on the sets of pixel values determined by the intra-prediction performed on the blocks to be decoded.

Figure 3F:
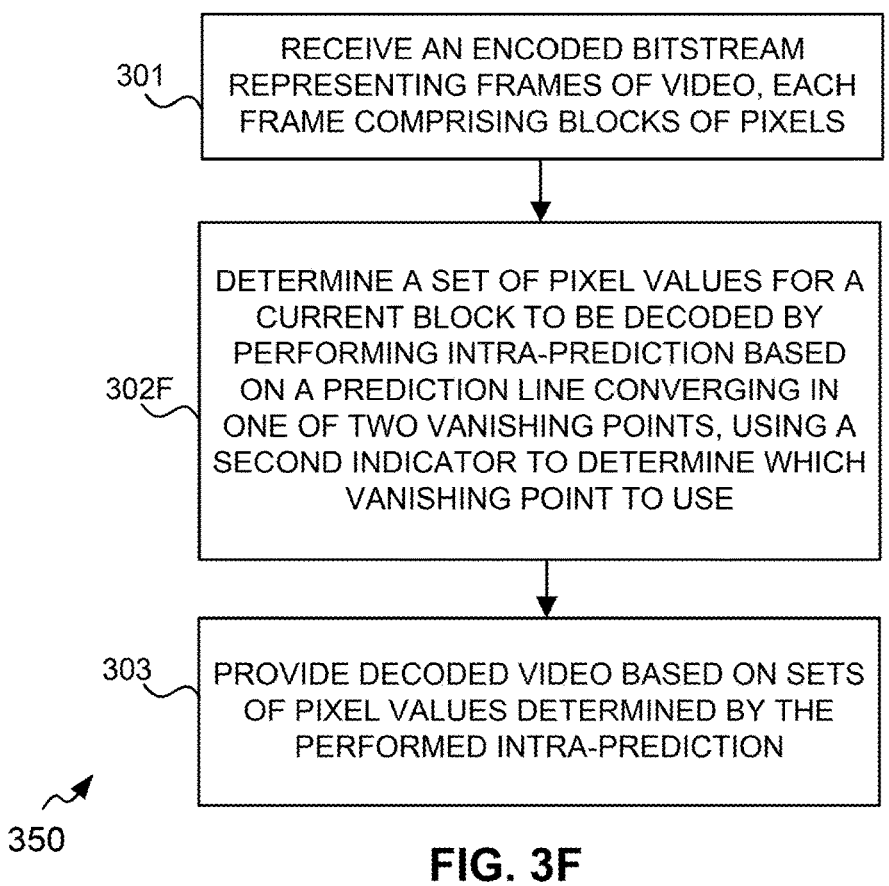
FIG. 3F is a flow chart illustrating a method according to an example.

FIG. 3F is a flow chart illustrating a method of decoding video according to an example. At operation 301, an input unit of a video decoder receives an encoded bit stream representing frames of video. Each of the frames comprises blocks of pixels. In addition to residuals related data, the bit stream may comprise e.g. one or more of the following: partitioning flags, prediction parameters, information on one or more vanishing point(s), information on one or more prediction line(s), and the like.

At operation 302F, an intra-prediction unit of the video decoder determines a set of pixel values for a current block to be decoded, by performing intra-prediction at least partially based on a prediction line originating in a vanishing point for the current block to be decoded. The video may comprise non-spherical video in which case the prediction line comprises a straight line, or the video may comprise spherical video in which case the prediction line comprises a geodesic curve. Here, the intra-prediction is performed based on one of at least two vanishing points for at least one of the frames of video represented by the received encoded bit stream, and a second indicator is used to determine which particular vanishing point is used to define the prediction line.

The vanishing point to use may be determined e.g. by the intra-prediction unit of the video decoder (or by any other suitable entity and then received by the intra-prediction unit of the video decoder) before doing intra-prediction. Furthermore, the prediction line may be determined by the intra-prediction unit 112 (or by any other suitable entity and then received by the intra-prediction unit 112) on the basis of the determined vanishing point.

E.g. in the examples of FIG. 1B and FIG. 3A to FIG. 3F, for a given block to be predicted, the video decoder may extract the position of a vanishing point from the bit stream. The vanishing point implicitly defines, for each pixel of the block, a corresponding set of one or more reference pixels (i.e. a reference pixel set). The video decoder may determine a predicted value of each pixel of the block on the basis of the pixel values of the corresponding reference pixel set, e.g. by extrapolation or by interpolation. For example, in one implementation form, the reference pixel set consists of a single reference pixel and the value of that reference pixel is taken as the predicted value of the corresponding pixel of the block.

At operation 303, an output unit of the video decoder provides decoded video based on the sets of pixel values determined by the intra-prediction performed on the blocks to be decoded.

The following discusses the examples of FIGS. 1A-1B, 2A-2F and 3A-3F in further detail when applied to non-spherical video.

Currently, an intra-prediction unit typically uses reference pixels from an already encoded area to generate the prediction signal for the block that needs to be encoded. In addition to DC and planar modes which may be used to generate smoothed predictions, angular (or directional) prediction modes may be used e.g. to represent blocks containing directional textures, edges and lines. These angular prediction modes generate the prediction signal along a straight line in one of possible directions. Signaling of the direction may be costly. For example, the H.265 video coding standard currently has 33 directional modes plus DC and planar modes. Having such a high number of possible modes requires a significant amount of bits for coding the prediction mode.

To alleviate this, the examples of FIGS. 1A-1B, 2A-2F and 3A-3F use one or more vanishing points obtained e.g. with any suitable detection algorithms or the like for intra-frame prediction. The positions of the vanishing points may be passed to the decoder e.g. as meta data or they may be derived on the decoder side. Having the vanishing points on the decoder side, it is possible to signal whether the prediction direction of the current block runs to a vanishing point or not. If it does, there is no need to signal the line angle.

Figure 4A:
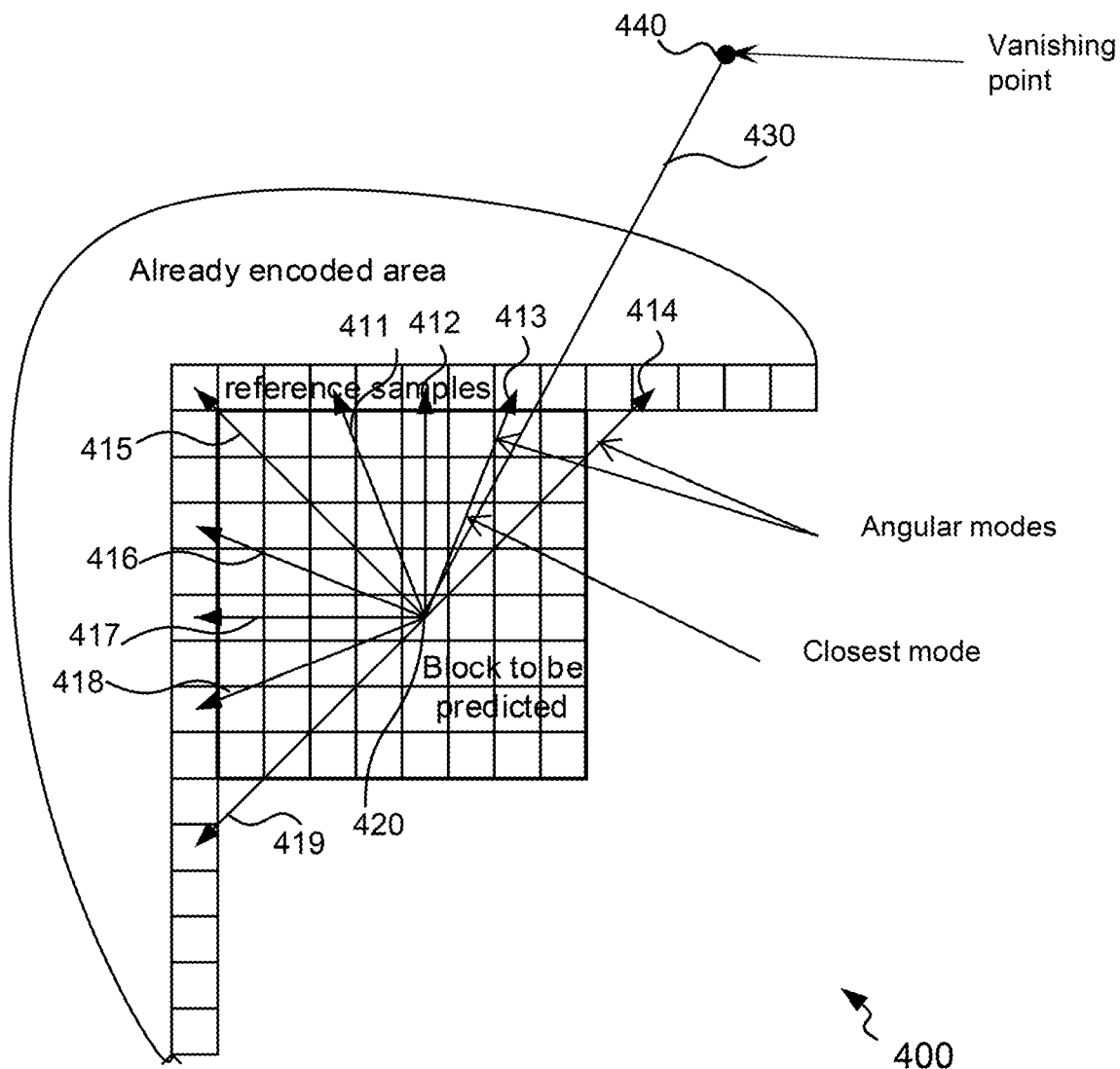
FIG. 4A illustrates an example of intra-prediction using a directional mode closest to a prediction line converging in a vanishing point.
Figure 12:
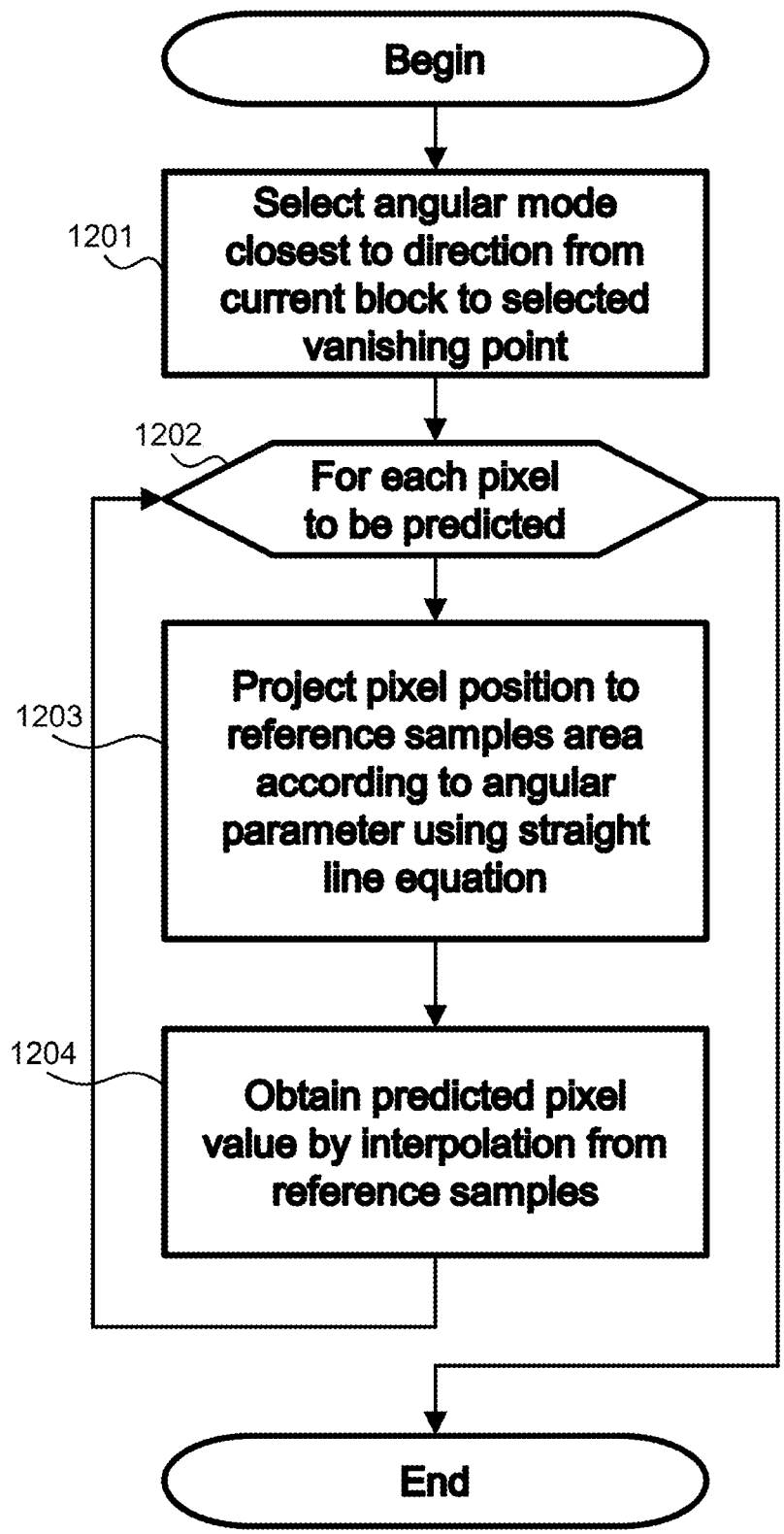
FIG. 12 to FIG. 16 illustrate additional examples of methods.

As illustrated in the example 400 of FIG. 4A, the position of a point 420 in a current block (e.g. center of the block or top left corner) to be predicted may be obtained. A perspective line from the selected point 420 to the vanishing point 440 may be determined for use as a prediction line 430. Out of available angular modes 411-419, the one closest to the prediction line 430 is selected. In the example 400 of FIG. 4A, the closest one is angular mode 413. The closeness may be determined e.g. by a minimum difference between the angles of the prediction line 430 and the angular modes 411-419. Then, the closest angular mode 413 may be used for the prediction of the current block. This approach may allow simplified computations. This is further illustrated by flow chart steps 1201-1204 in FIG. 12.

Figure 4B:
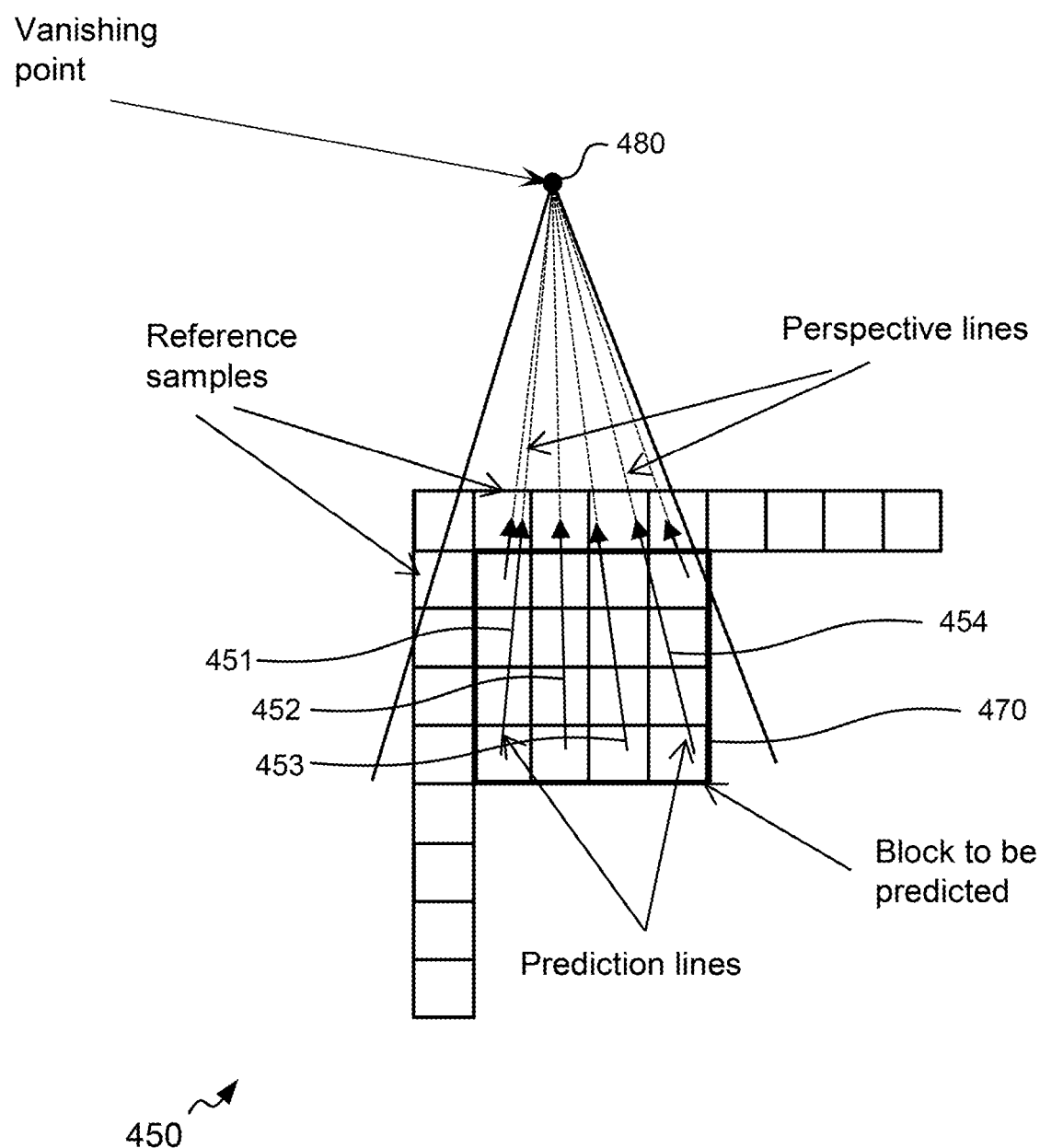
FIG. 4B illustrates an example of intra-prediction along pixel-specific prediction lines originating in a vanishing point.
Figure 13:
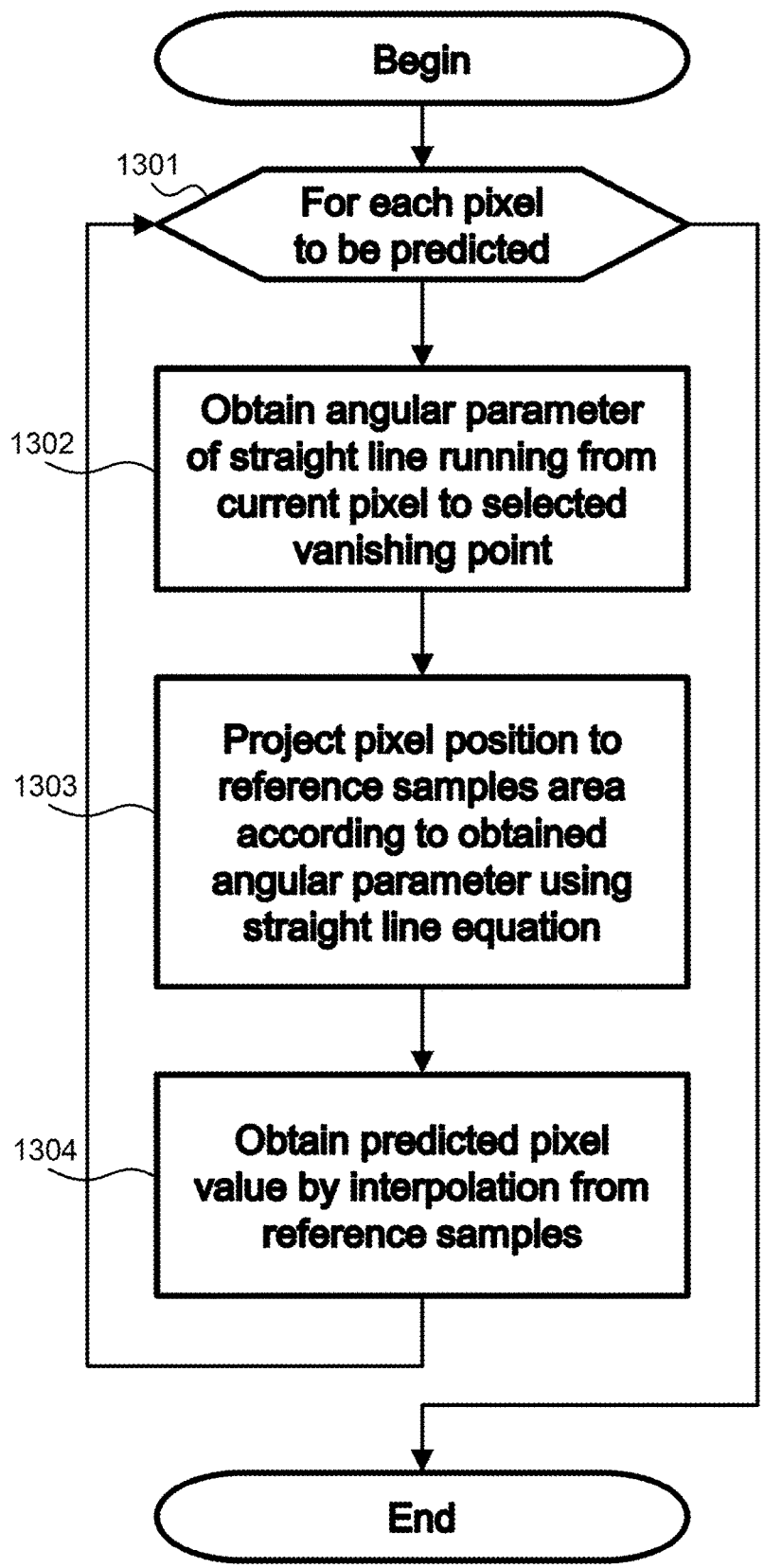

Alternatively, as illustrated in the example 450 of FIG. 4B, for each pixel of the block 470 to be predicted, perspective lines may be determined from each current point to the vanishing point 480 for use as a prediction lines 451-454. For each pixel, intra-prediction is then performed along its associated pixel specific prediction line. That is, for each pixel (current pixel) to be predicted, one or more reference pixels are selected, at least one of those reference pixels being located on the prediction line. In encoding, a residual of the current pixel is determined based on the value of the current pixel and the values of the one or more reference pixels. In decoding, the value of the current pixel is determined based on the values of the one or more reference pixels and the residual. This is further illustrated by flow chart steps 1301-1304 in FIG. 13.

The following discusses the examples of FIGS. 1A-1B, 2A-2F and 3A-3F in further detail when applied to spherical video.

360-degree video or spherical video is a new way of experiencing immersive video using devices such as head-mounted displays (HMD). This technique can provide an immersive "being there" experience for consumers by capturing a full panoramic view of the world. 360-degree video is typically recorded using a special rig of multiple cameras, or using a dedicated virtual reality (VR) camera that contains multiple embedded camera lenses. The resulting footage is then stitched to form a single video. This process may be done by the camera itself, or by using video editing software that can analyze common visuals to synchronize and link the different camera feeds together to represent the full viewing sphere surrounding the camera rig. Essentially, the camera or the camera system maps a 360° scene onto a sphere.

The stitched image (i.e. the image on the surface of the sphere) is then mapped (or unfolded) from spherical into a two-dimensional (2D) rectangular representation based on projection (such as equirectangular projection), and then encoded using e.g. standard video codecs such as H.264/AVC (Advanced Video Coding) and H.265/HEVC (High Efficiency Video Coding).

At the viewing end, after decoding the video is mapped onto a virtual sphere with the viewer located at the center of the virtual sphere. The viewer can navigate inside the virtual sphere to see a view of the 360-degree world as desired and thereby have an immersive experience.

Figure 5:
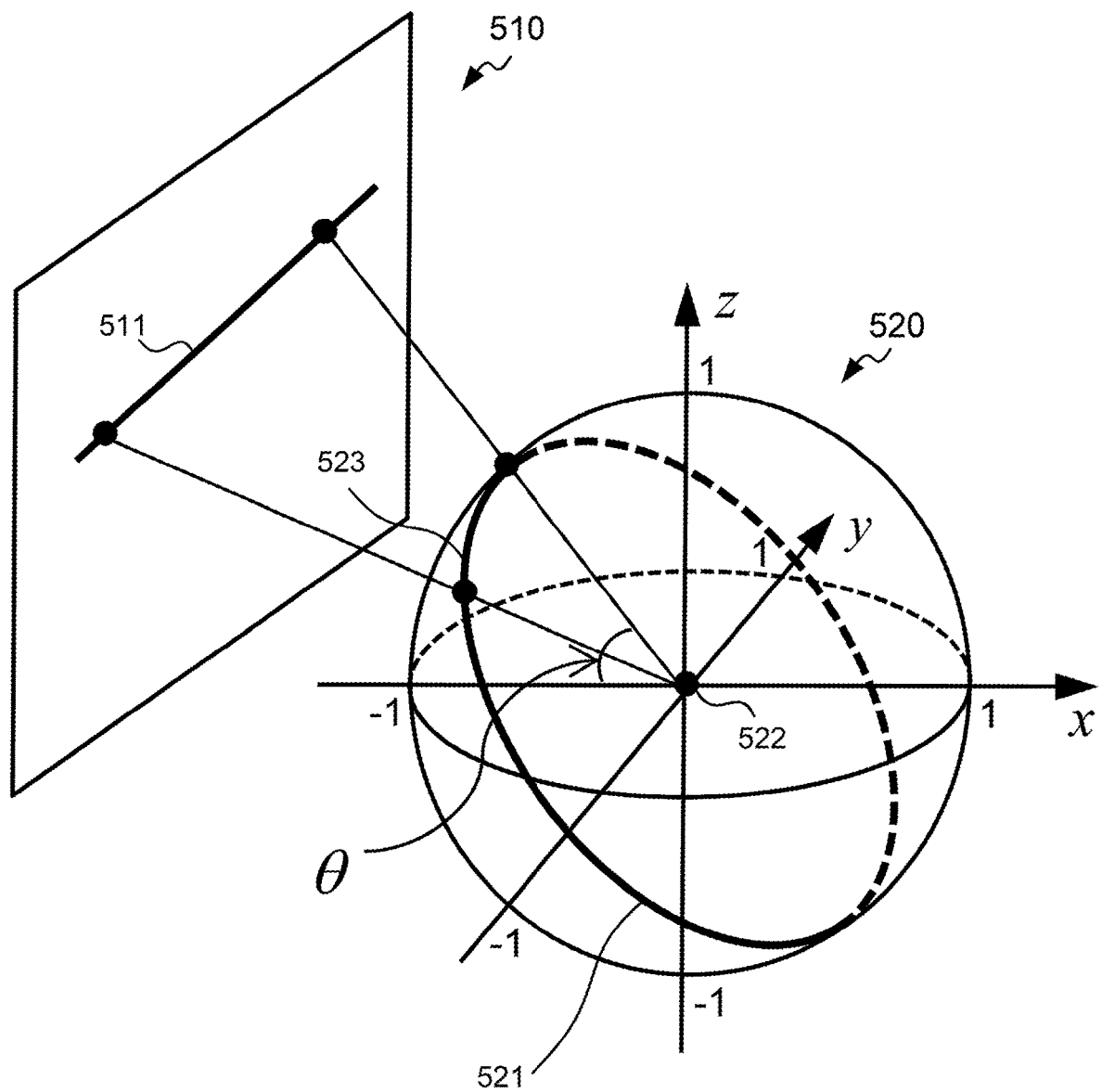
FIG. 5 illustrates an example of a straight line to sphere projection.

As illustrated in FIG. 5, a geodesic curve 523 is a projection of a straight line 511 of a scene 510 on a viewing sphere 520. More specifically, a geodesic curve is a part (i.e. arc 523) of a great circle 521. A great circle is a circle 521 inside the plane defined by the straight line 511 and the sphere's center 522.

From mathematics, it is known that an infinite number of lines (or parts of circles or arcs) may pass through two points on a sphere. Only one of them is lying on a great circle. That means that once the position of two points of a line on a viewing sphere is known, one and only one geodesic curve can be determined coming through these two points. Parameters of curvature of this geodesic curve in the equirectangular projection (or any other type of sphere-to-2D projection) are completely defined by these two points and can be derived without explicit signaling.

Figure 6:
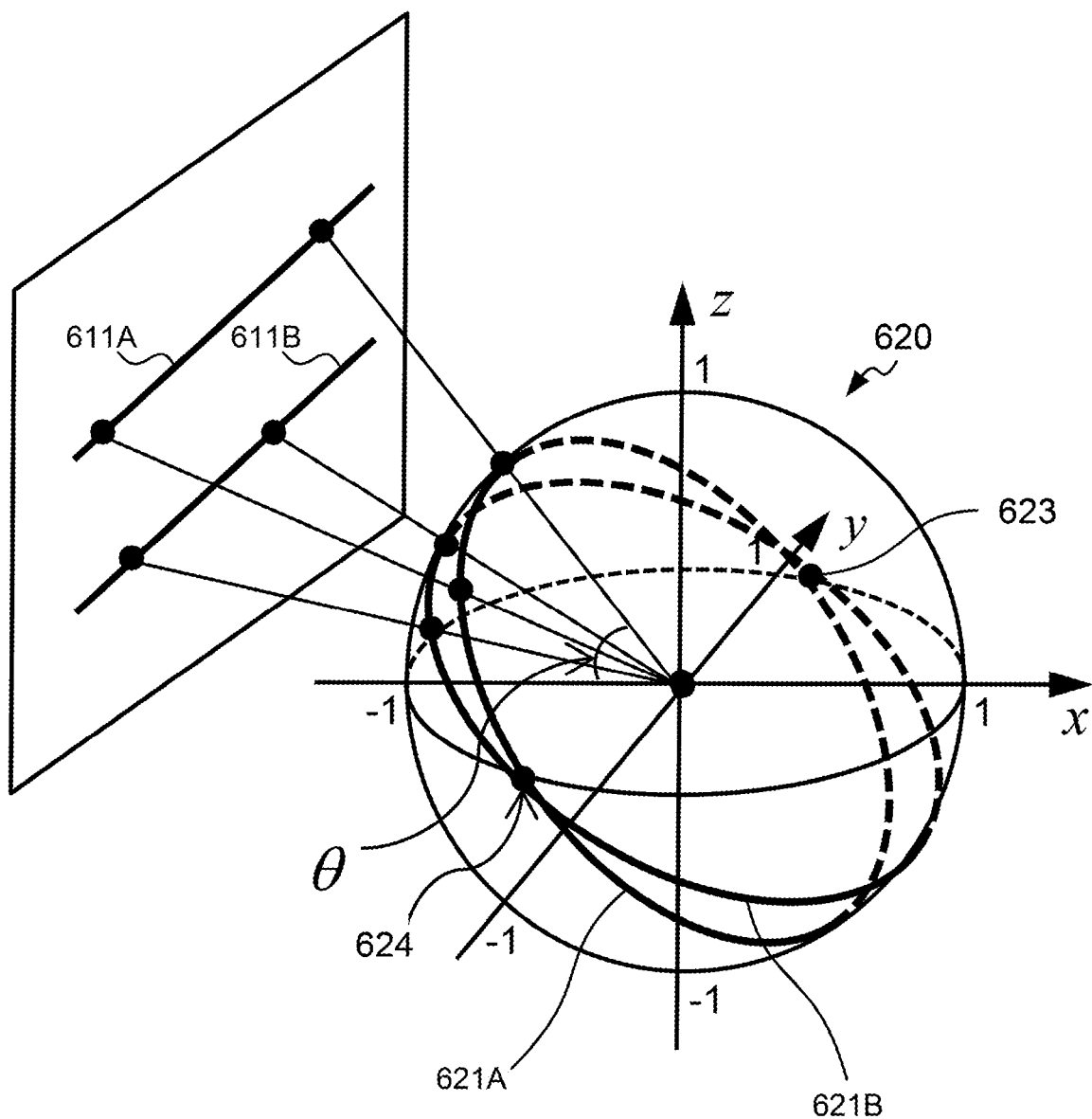
FIG. 6 illustrates an example of parallel lines to sphere projection.
Figure 8:
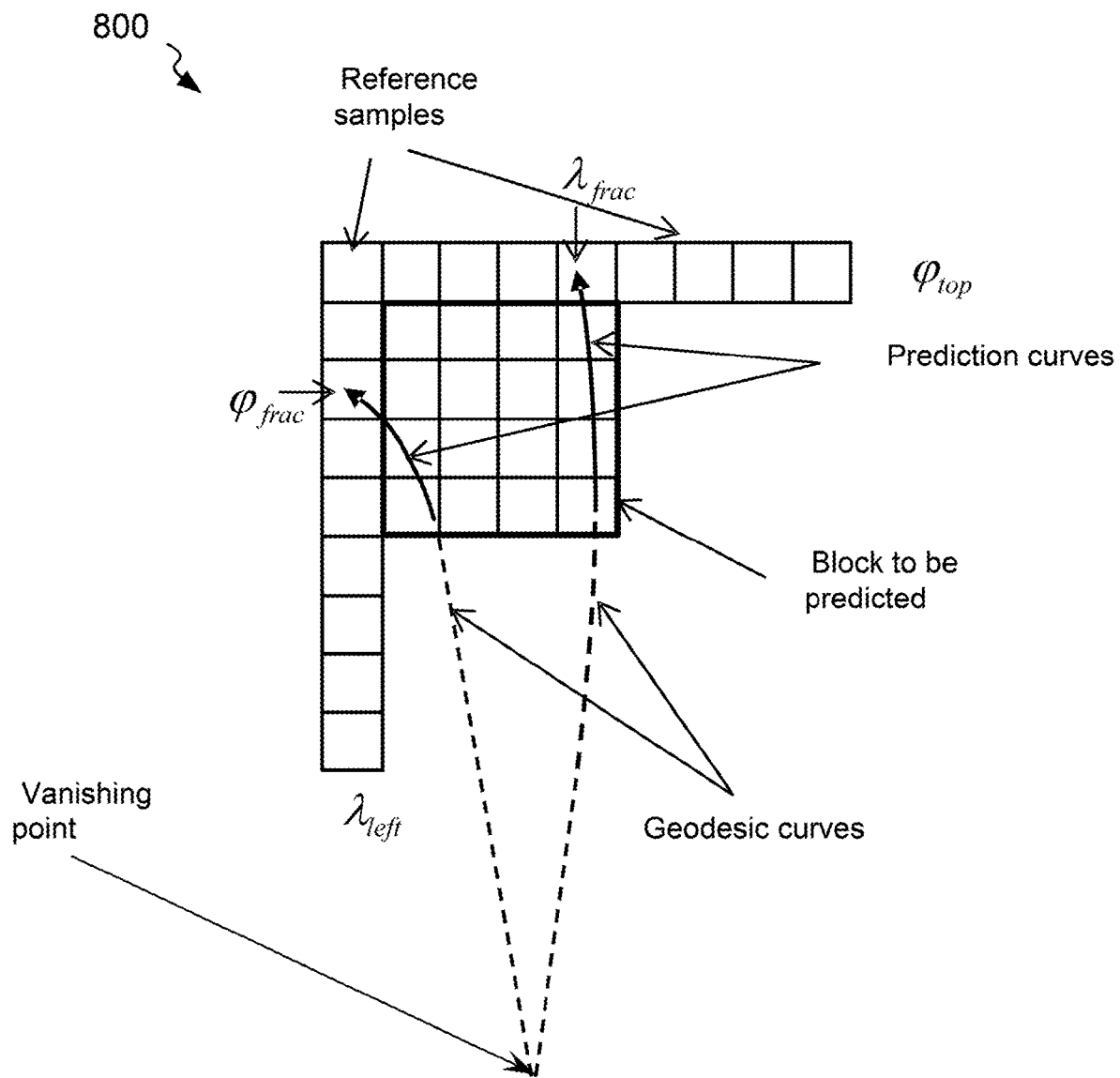
FIG. 8 illustrates an example of using intra-prediction with perspective information for spherical video.

As with non-spherical video, vanishing points may be determined for spherical video by using any suitable detection algorithms or the like. As discussed above, straight lines are projected to a unit sphere as geodesic curves. A geodesic curve is a part of a great circle which is the intersection of sphere and the plane defined by the straight line and the sphere's center. As shown in FIG. 6, two parallel lines 611A, 611B are projected on two great circles 621A, 621B crossing in two points (i.e. front and rear vanishing points 623, 624). A geodesic curve is analogous of a straight line on the sphere 620. Through each two points on the sphere 620, only one geodesic curve may be drawn. In the case of spherical video, the current pixel position on an image frame that needs to be predicted may be obtained (the vanishing point position having been determined previously) and an geodesic curve may be determined on the sphere 620 over these two points, and the intra-prediction may then be performed along this curve, as further illustrated in the example 800 of FIG. 8.

Figure 7:
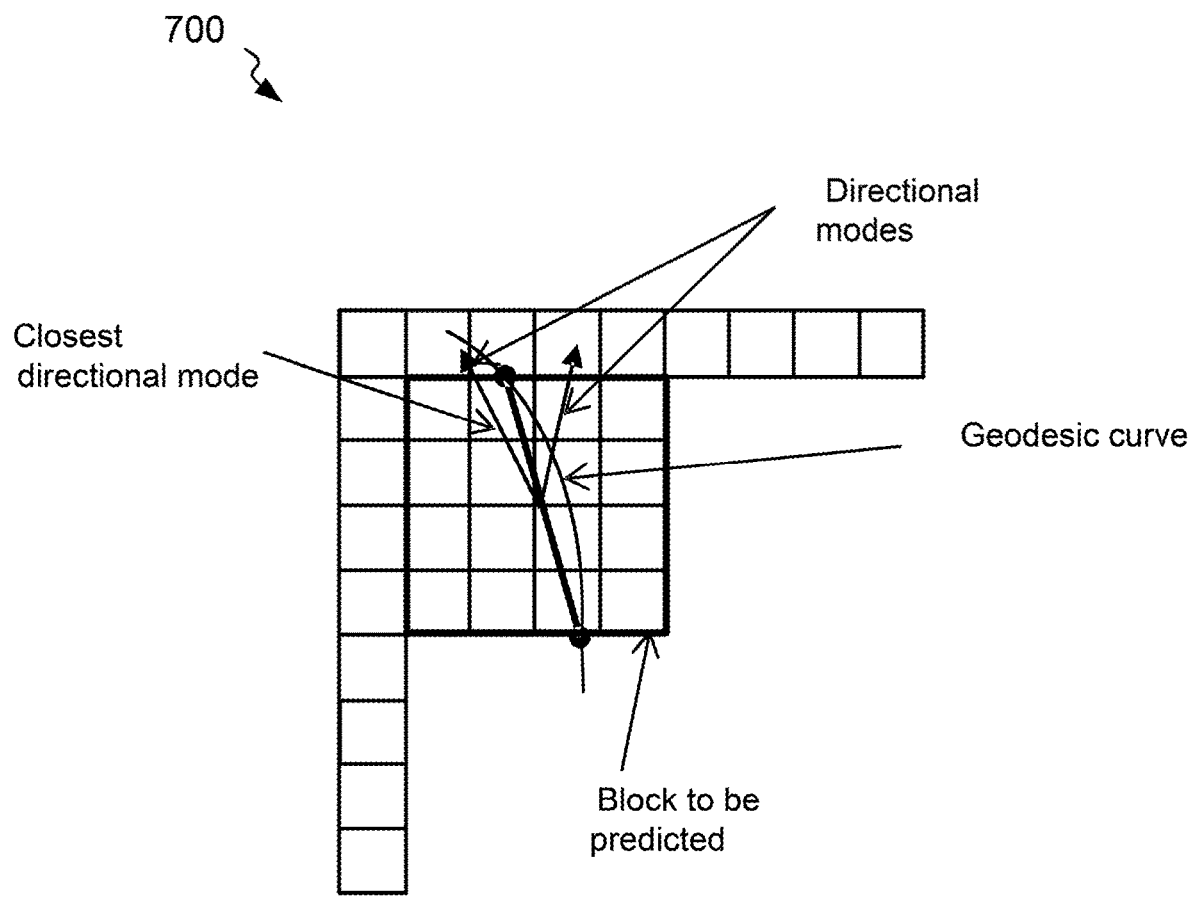
FIG. 7 illustrates an example of selection of a directional mode closest to a geodesic curve.
Figure 14:
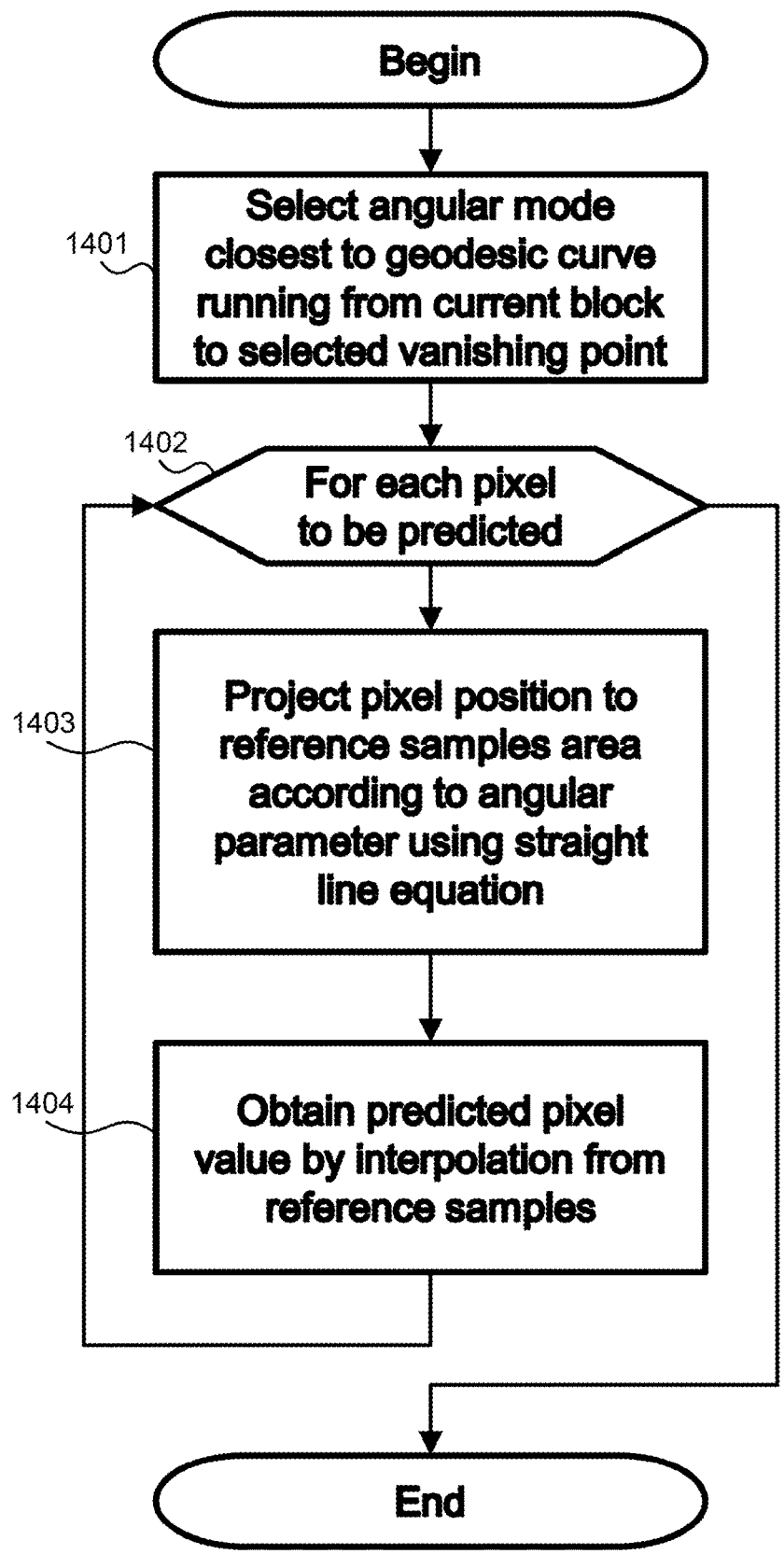

As illustrated in the example 700 of FIG. 7, the position of a point in the current block (e.g. the center of the block or the top left corner) may be obtained. A geodesic curve may be determined from the selected point to the vanishing point. One of the available angular modes that best fits to the geodesic curve may be selected e.g. by determining a line over the points in which the geodesic curve crosses the current block and choosing the angular mode that has a minimum angle difference with the determined line. Then, the closest angular mode may be used for the intra-prediction of the current block. This approach may allow simplified computations. This is further illustrated by flow chart steps 1401-1404 in FIG. 14.

Figure 15:
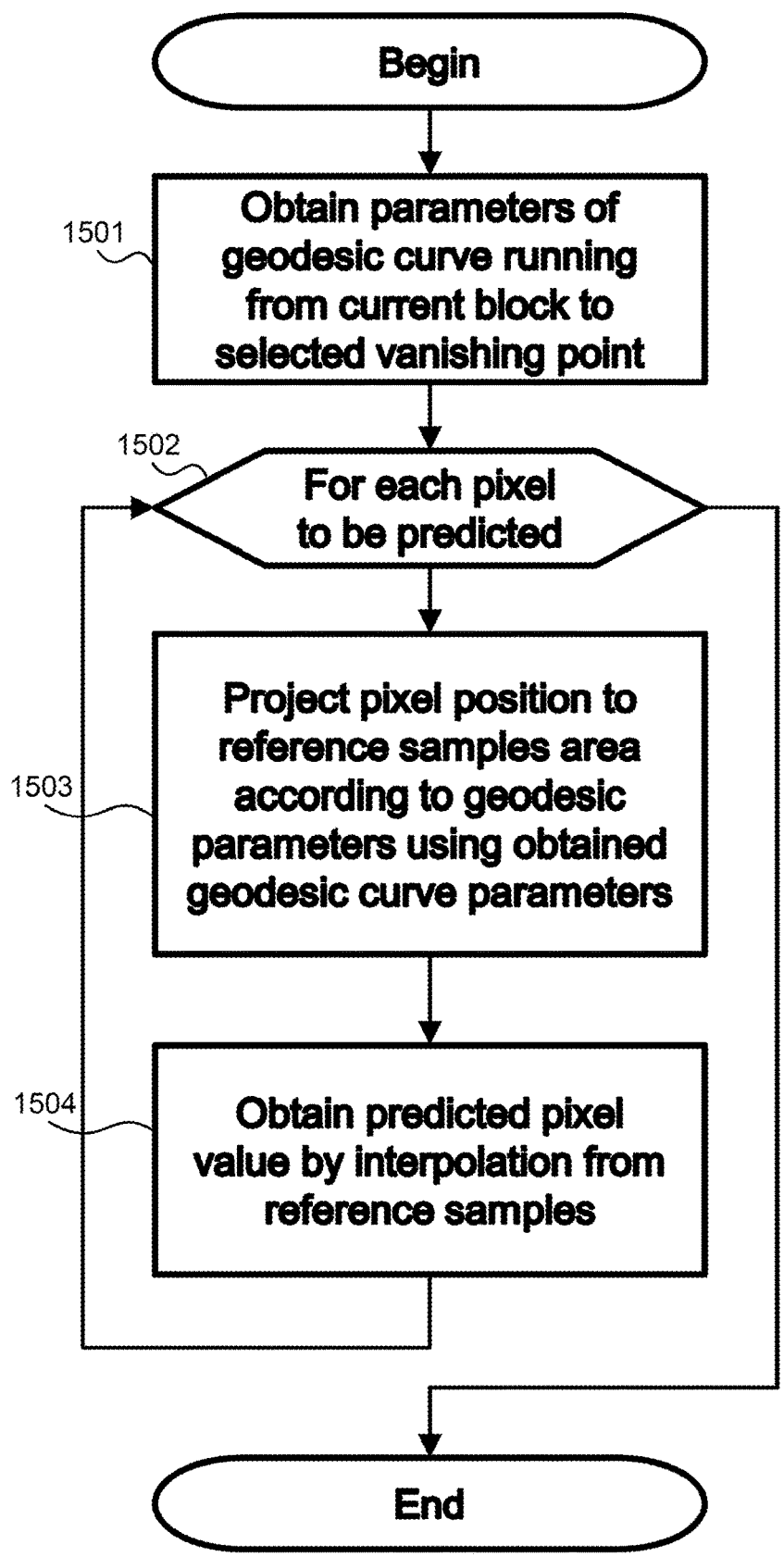

Alternatively, the position of a point in the current block (e.g. the center of the block or the top left corner) may be obtained. A geodesic curve may be determined from the selected point to the vanishing point, and parameters of the determined geodesic curve may be obtained. For each pixel of the block to be predicted, intra-prediction may then be performed along geodesic curve using the obtained parameters. This is further illustrated by flow chart steps 1501-1504 in FIG. 15.

Figure 16:
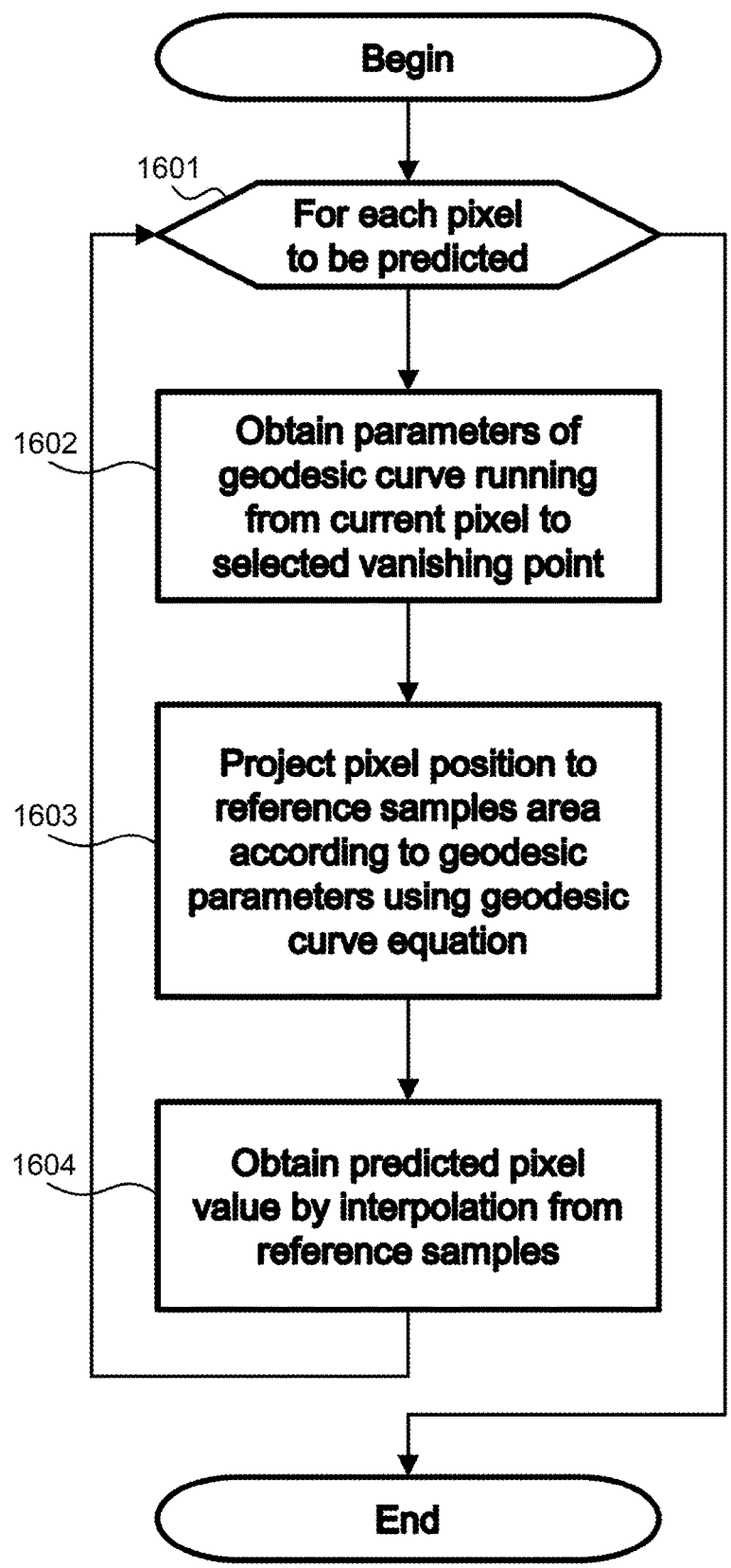

Alternatively, for each pixel of the block to be predicted, a geodesic curve may be determined from the current point to the vanishing point. Then, intra-prediction may be performed along this determined geodesic curve. This is further illustrated by flow chart steps 1601-1604 in FIG. 16.

As discussed above, more than one vanishing point may be chosen and used for prediction in any of the examples of FIGS. 1A-1B, 2A-2F and 3A-3F. Since there are many parallel and orthogonal lines (e.g. buildings, windows, rooms etc.) in the Manhattan world, a second vanishing point may be chosen e.g. as a 90 degree distant point from the dominant direction. In the spherical representation, this may be done e.g. by shifting the longitude coordinate by 90 degrees. Another approach is to choose another maximum in the histogram of the number of lines crossing in potential vanishing points.

If several vanishing points are chosen in the picture or in a part of the picture, each vanishing point may be assigned its own identifier. For each block, one of the possible vanishing points may be chosen and signaled with this identifier.

Figure 17:
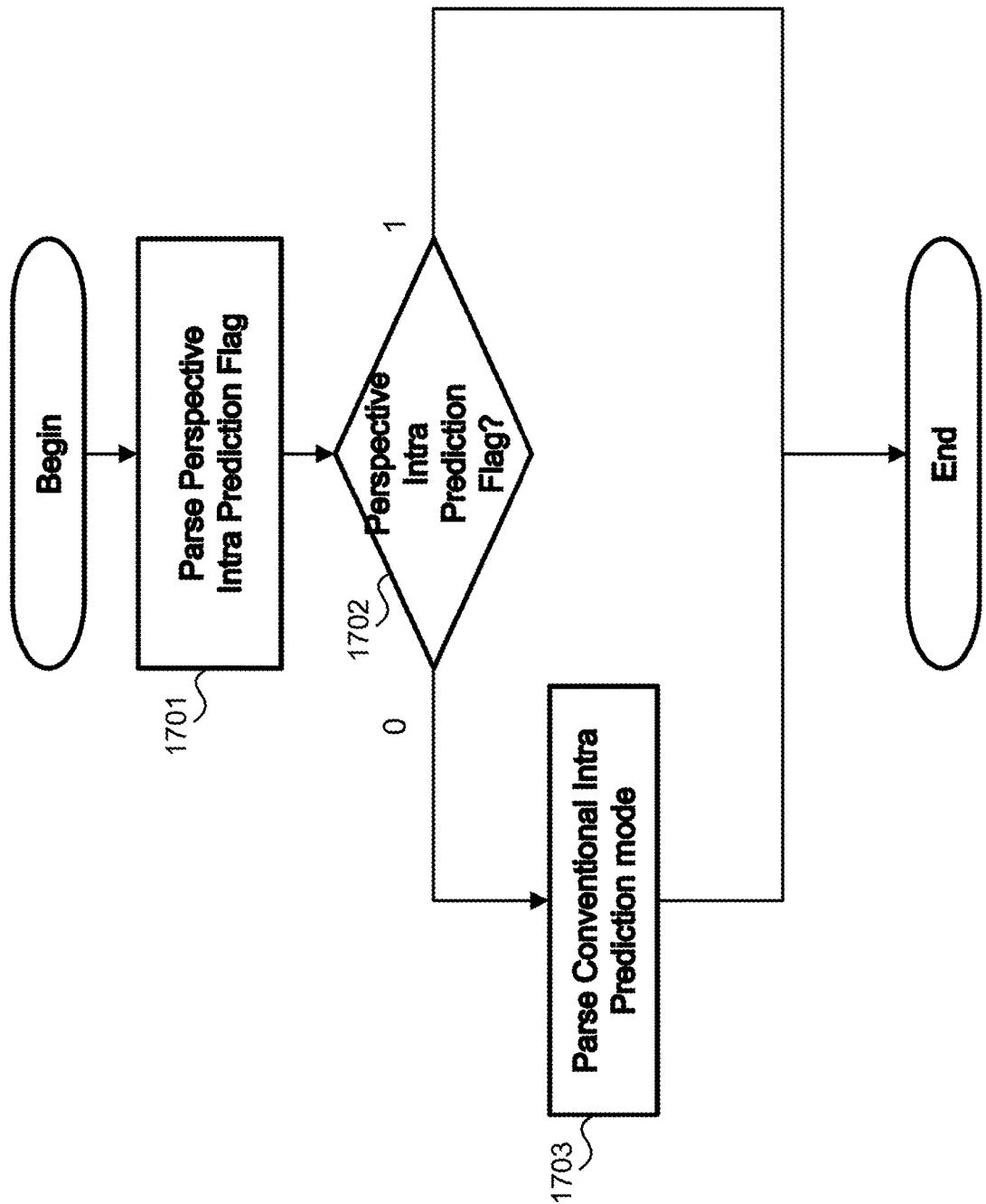
FIG. 17 to FIG. 18 illustrate examples of parsing of intra-prediction flags.
Figure 18:
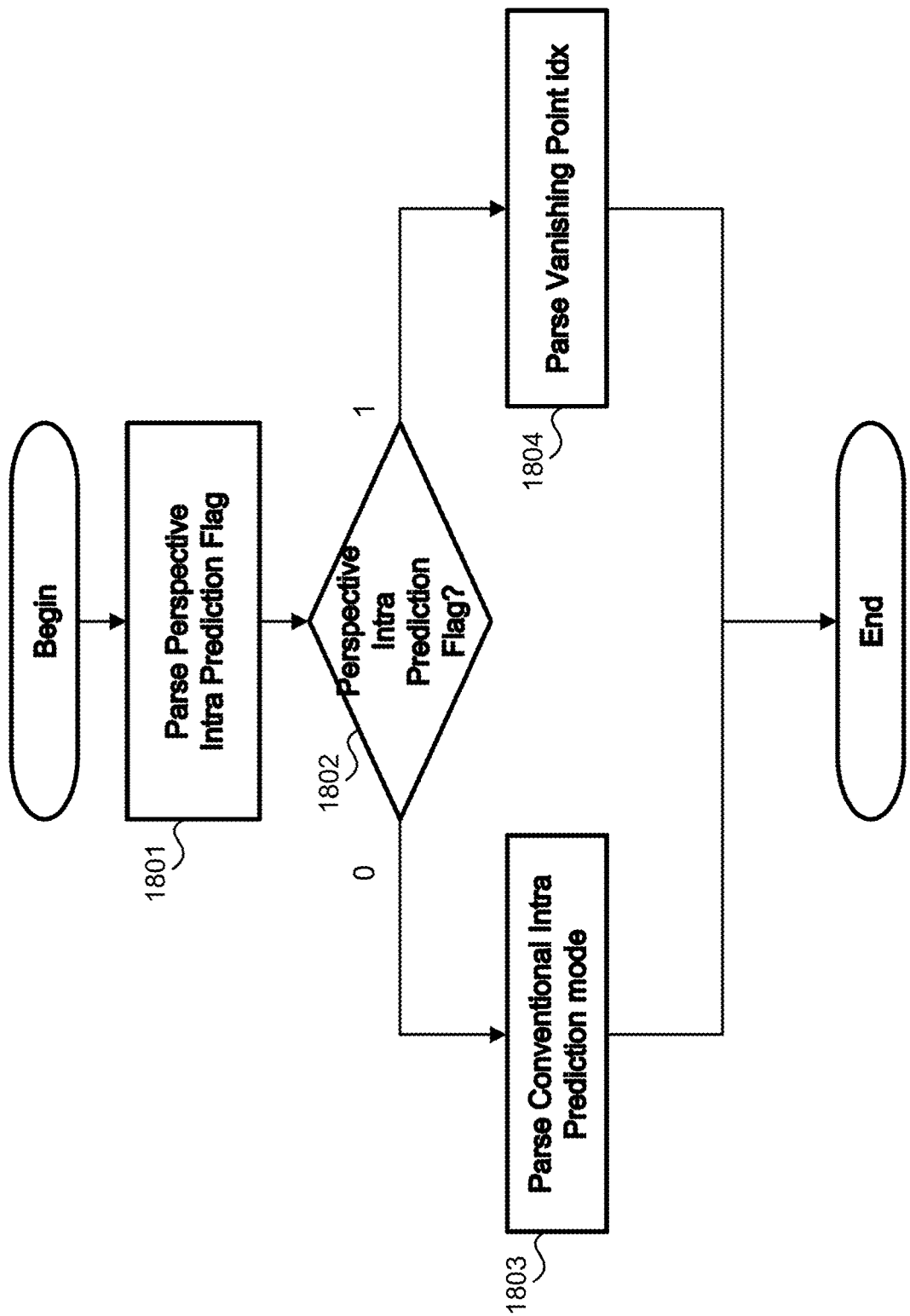

As discussed above, a single identifier may be used in any of the examples of FIGS. 1A-1B, 2A-2F and 3A-3F for all prediction lines originating in one preselected vanishing point. Several signaling variants may be implemented to allow this:

1) a first bit flag or indicator may be used to mark whether the prediction direction of the current block runs to one of the preselected vanishing points. This is further illustrated by flow chart steps 1701-1703 in FIG. 17. A second bit flag or indicator may be used to signal which particular vanishing point is used in case two vanishing points were preselected. Even more vanishing points may be signaled in a similar manner. This is further illustrated by flow chart steps 1801-1804 in FIG. 18.

2) a perspective prediction identifier may be added to the list of available intramodes and a conventional mode may be used as a signaling mechanism. If the perspective prediction identifier is chosen, an additional identifier is signaled to identify which particular vanishing point is used.

3) several perspective prediction identifiers corresponding to several vanishing points are added. A conventional intra-prediction mode signaling mechanism is then used.

Figure 19:
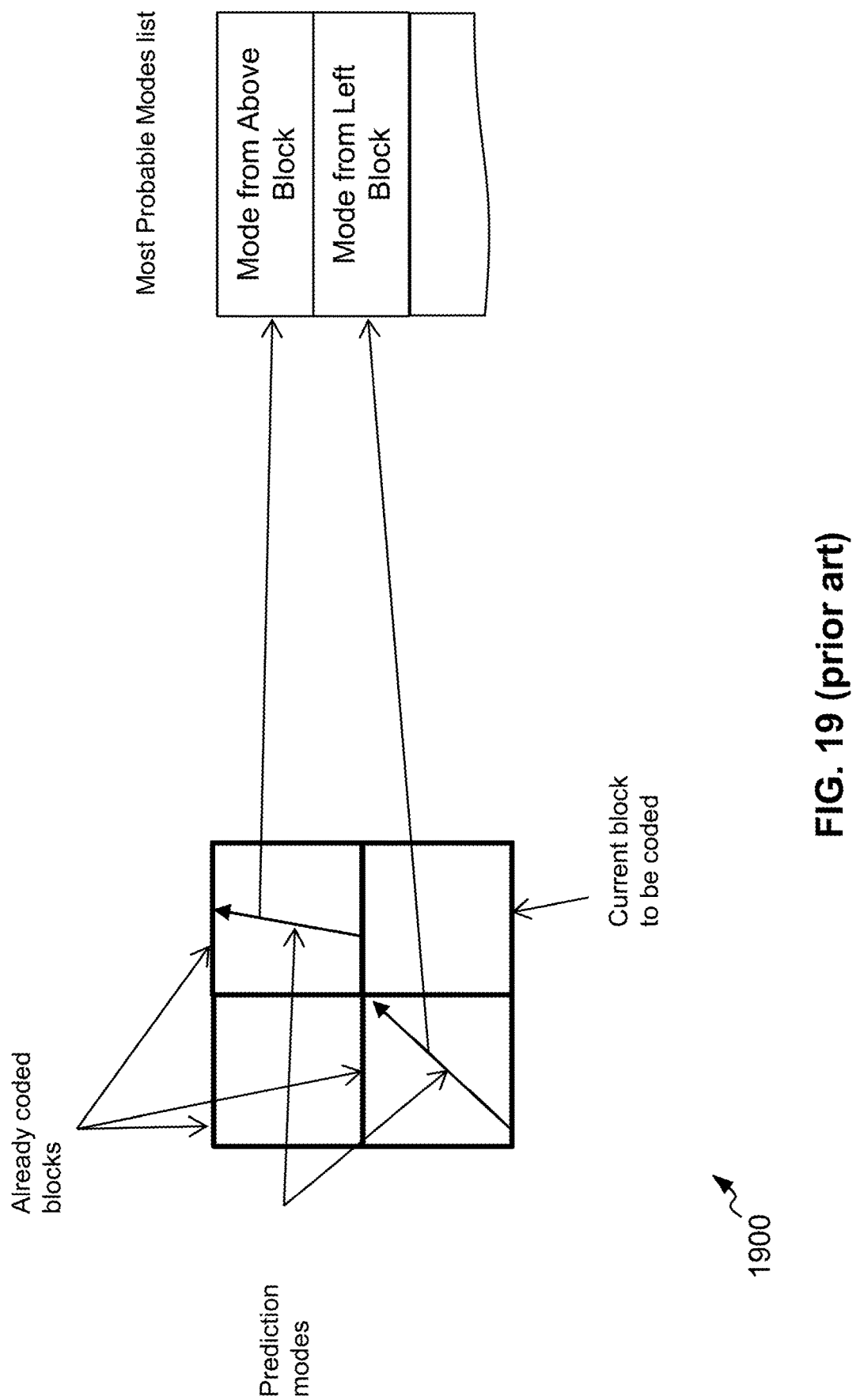
FIG. 19 illustrates an example of prior art MPM (most probable modes) generation.

A 'most probable modes' (MPM) list may be used to optimize signaling e.g. in H.265/HEVC. The reason for this is to shorten the list of possible modes by preselecting modes from already coded neighboring blocks, as illustrated by diagram 1900 in FIG. 19. This allows spending fewer bits for signaling the mode index in the shortened list.

Figure 20:
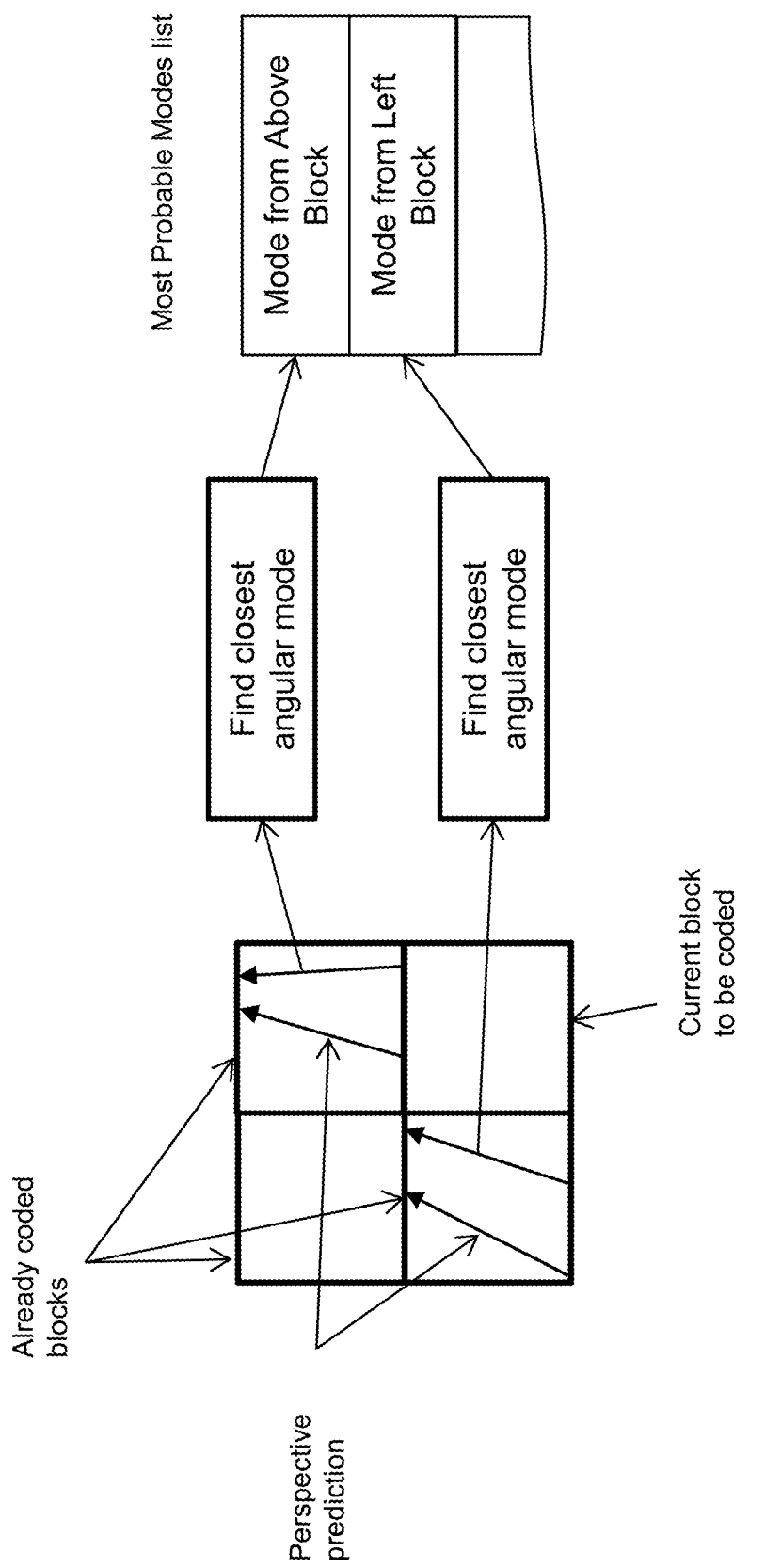
FIG. 20 to FIG. 22 illustrate examples of MPM generation.

Accordingly, in the examples of FIGS. 1A-1B, 2A-2F and 3A-3F, as applied to non-spherical video and the above described signaling variant 1), the directional mode closest to the perspective prediction may be determined e.g. as in the example of FIG. 4A, and that may then be used for MPM list initialization, as further illustrated by diagram 2000 in FIG. 20.

Figure 21:
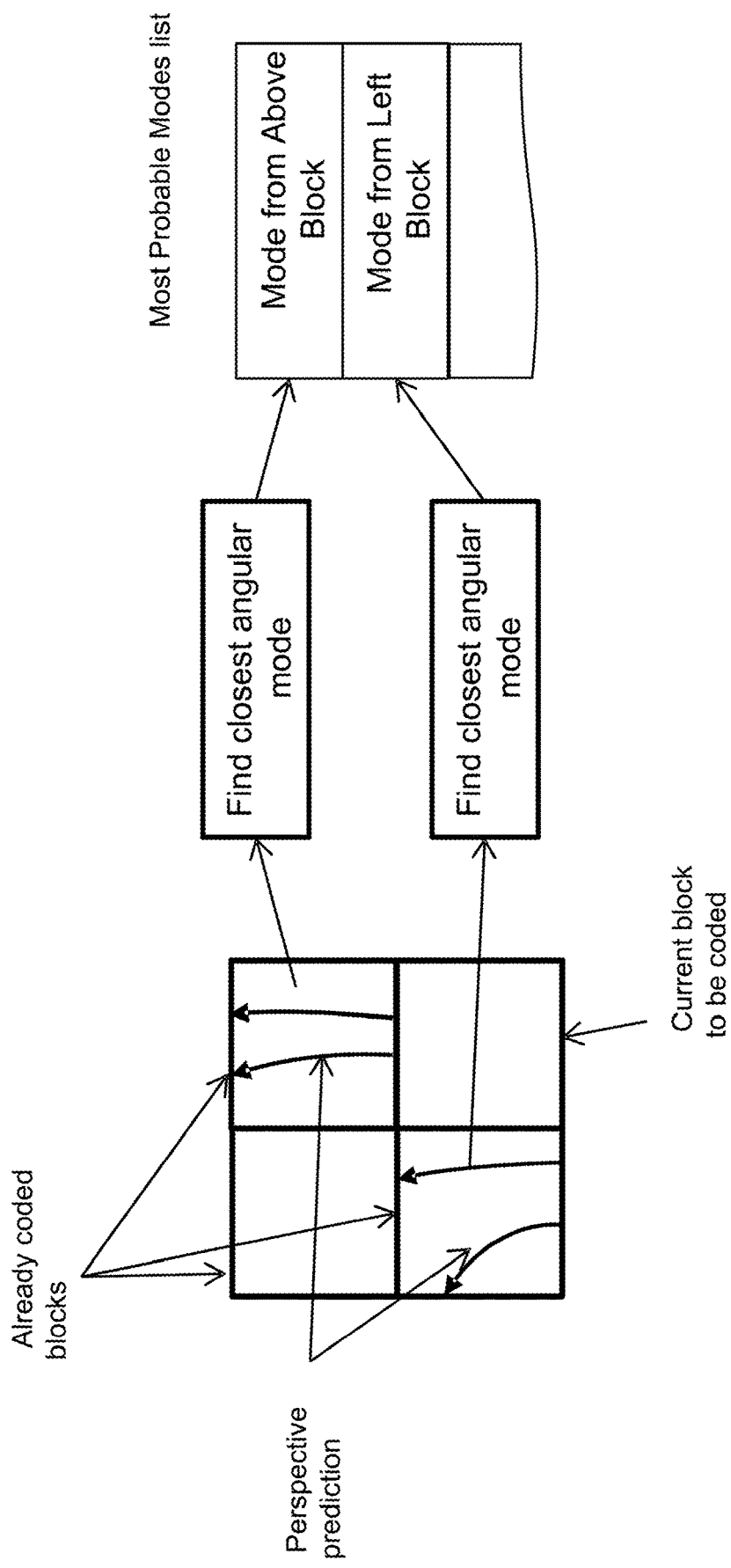
Figure 22:
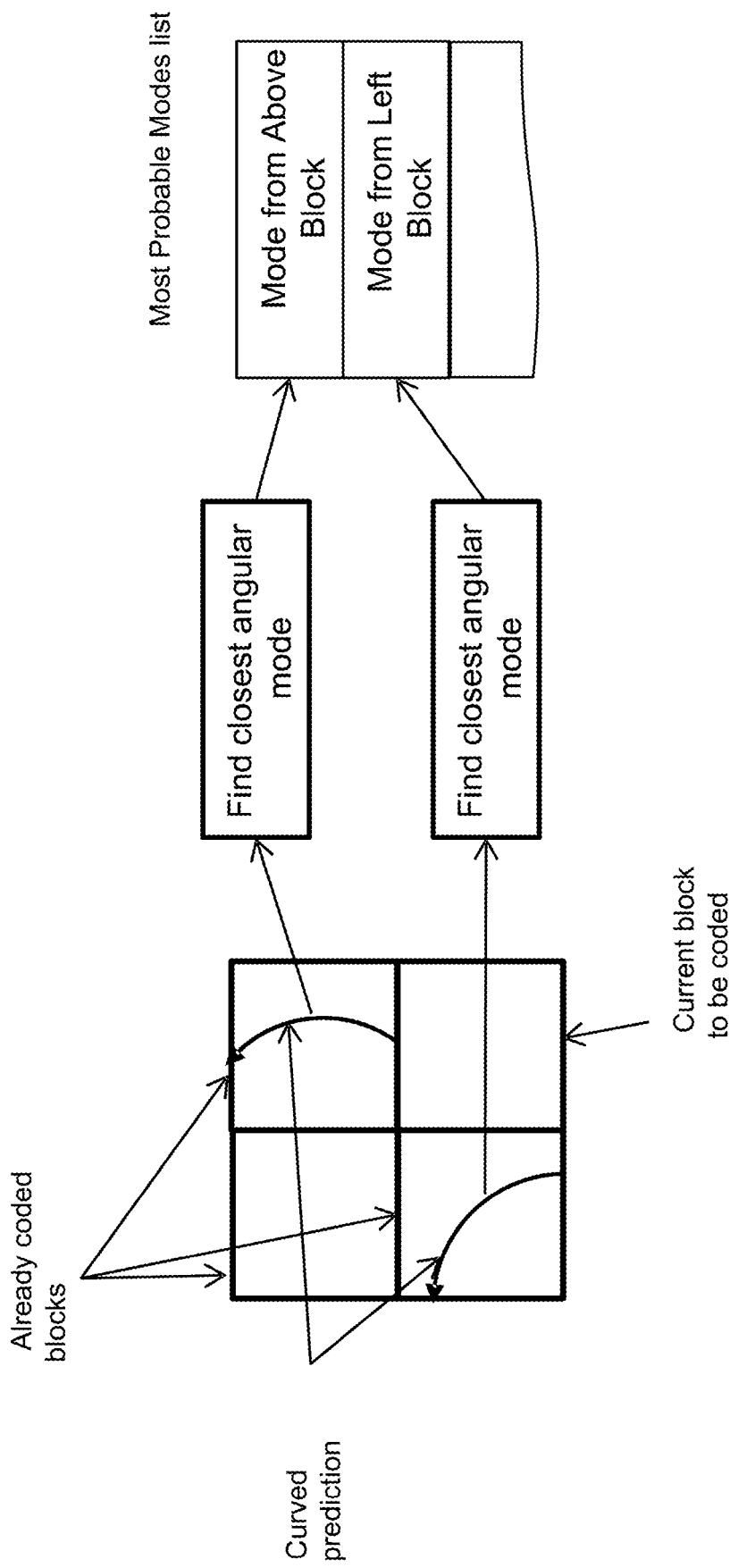

In the examples of FIGS. 1A-1B, 2A-2F and 3A-3F, as applied to spherical video and the above described signaling variant 1), a directional mode closest to perspective prediction along geodesic curves, may be determined e.g. as in the example of FIG. 7, and that may then be used for MPM list initialization, as further illustrated by diagram 2100 in FIG. 21. Furthermore, any type of curved prediction may be used, as further illustrated by diagram 2200 in FIG. 22.

The functionality described herein can be performed, at least in part, by program code, e.g., provided on a non-transitory computer-readable storage medium (e.g., magnetic, electronic, optical, or any combination thereof; for example a hard disk, flash drive, EPROM, CD, DVD, or Blu-ray disk). According to an embodiment, the video encoder 100 and/or video decoder 110 comprise a processor configured by program code to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A video encoder, comprising:
   a processor; and
   a memory coupled to the processor and storing instructions that when executed configure the processor to perform steps comprising:
   receiving frames of video, each of the frames comprising blocks of pixels, wherein the video comprises spherical video;
   determining, for a current block to be encoded, a vanishing point in which perspective lines seem to converge and to generate a residual by performing intra-prediction based on a prediction line which originates in the vanishing point and runs through a current pixel in the current block, wherein the prediction line comprises a geodesic curve; and
   providing an encoded bit stream based on the residual.

2. The video encoder according to claim 1, wherein the video further comprises non-spherical video and the prediction line further comprises a straight line.

3. The video encoder according to claim 1, wherein the memory stores further instructions that when executed further configure the processor to perform steps comprising performing the intra-prediction along the prediction line for every pixel of the current block to be decoded.

4. The video encoder according to claim 1, wherein the memory stores further instructions that when executed further configure the processor to perform steps comprising performing the intra-prediction by using a directional mode closest to the prediction line.

5. The video encoder according to claim 1, wherein the memory stores further instructions that when executed further configure the processor to perform steps comprising performing the intra-prediction along pixel-specific predetermined prediction lines originating in the vanishing point.

6. The video encoder according to claim 1, wherein the memory stores further instructions that when executed further configure the processor to perform steps comprising assigning an identical identifier for each prediction line originating in a same vanishing point.

7. The video encoder according to claim 1, wherein the memory stores further instructions that when executed further configure the processor to perform steps comprising using a first indicator to indicate whether to perform the intra-prediction based on the prediction line originating in the vanishing point.

8. The video encoder according to claim 1, wherein the memory stores further instructions that when executed further configure the processor to perform steps comprising performing the intra-prediction based on one of at least two vanishing points for at least one of the received frames of video.

9. The video encoder according to claim 8, wherein the memory stores further instructions that when executed further configure the processor to perform steps comprising using a second indicator to indicate which particular vanishing point is used to perform the intra-prediction along the prediction line.

10. A video decoder, comprising:
   a processor; and
   a memory storing instructions that when executed configure the processor to perform steps comprising:
   receiving an encoded bit stream representing frames of video, each of the frames comprising blocks of pixels, wherein the video comprises spherical video;
   obtaining, for a current block to be decoded, a vanishing point in which perspective lines seem to converge from the encoded bit stream and calculate pixel values of the current block to be decoded by performing intra-prediction based on a prediction line which originates in the vanishing point and runs through a current pixel in the current block, wherein the prediction line comprises a geodesic curve; and
   providing decoded video based on the calculated pixel values.

11. The video decoder according to claim 10, wherein the video further comprises non-spherical video and the prediction line further comprises a straight line.

12. The video decoder according to claim 10, wherein the memory stores further instructions that when executed further configure the processor to perform steps comprising performing intra-prediction along the prediction line for every pixel of the current block to be decoded.

13. The video decoder according to claim 10, wherein the memory stores further instructions that when executed further configure the processor to perform steps comprising performing the intra-prediction by using a directional mode closest to the prediction line.

14. The video decoder according to claim 10, wherein the memory stores further instructions that when executed further configure the processor to perform steps comprising performing the intra-prediction along pixel-specific prediction lines originating in the vanishing point.

15. The video decoder according to claim 10, wherein the memory stores further instructions that when executed further configure the processor to perform steps comprising using a first indicator to determine whether to perform the intra-prediction based on the prediction line originating in the predetermined vanishing point.

16. The video decoder according to claim 10, wherein the memory stores further instructions that when executed further configure the processor to perform steps comprising performing the intra-prediction based on one of at least two vanishing points for at least one of the frames of video represented by the received encoded bit stream.

17. The video decoder according to claim 16, wherein the memory stores further instructions that when executed further configure the processor to perform steps comprising using a second indicator to determine which particular vanishing point is used to perform the intra-prediction along the prediction line.

18. A method of decoding video, comprising:
   receiving an encoded bit stream representing frames of video, each of the frames comprising blocks of pixels, wherein the video comprises spherical video;
   for a current block to be decoded, obtaining a vanishing point in which perspective lines seem to converge from the encoded bit stream and calculating pixel values of the current block to be decoded by performing intra-prediction based on a prediction line which originates in the vanishing point and runs through a current pixel in the current block, wherein the prediction line comprises a geodesic curve; and
   providing decoded video based on the calculated pixel values.

19. A non-transitory computer readable medium storing instructions that, when executed by a computer, configure the computer to perform steps comprising:
   receiving an encoded bit stream representing frames of video, each of the frames comprising blocks of pixels, wherein the video comprises spherical video;
   for a current block to be decoded, obtaining a vanishing point in which perspective lines seem to converge from the encoded bit stream and calculating pixel values of the current block to be decoded by per-forming intra-prediction based on a prediction line which originates in the vanishing point and runs through a current pixel in the current block, wherein the prediction line comprises a geodesic curve; and
   providing decoded video based on the calculated pixel values.

* * * * *